Figure 1:
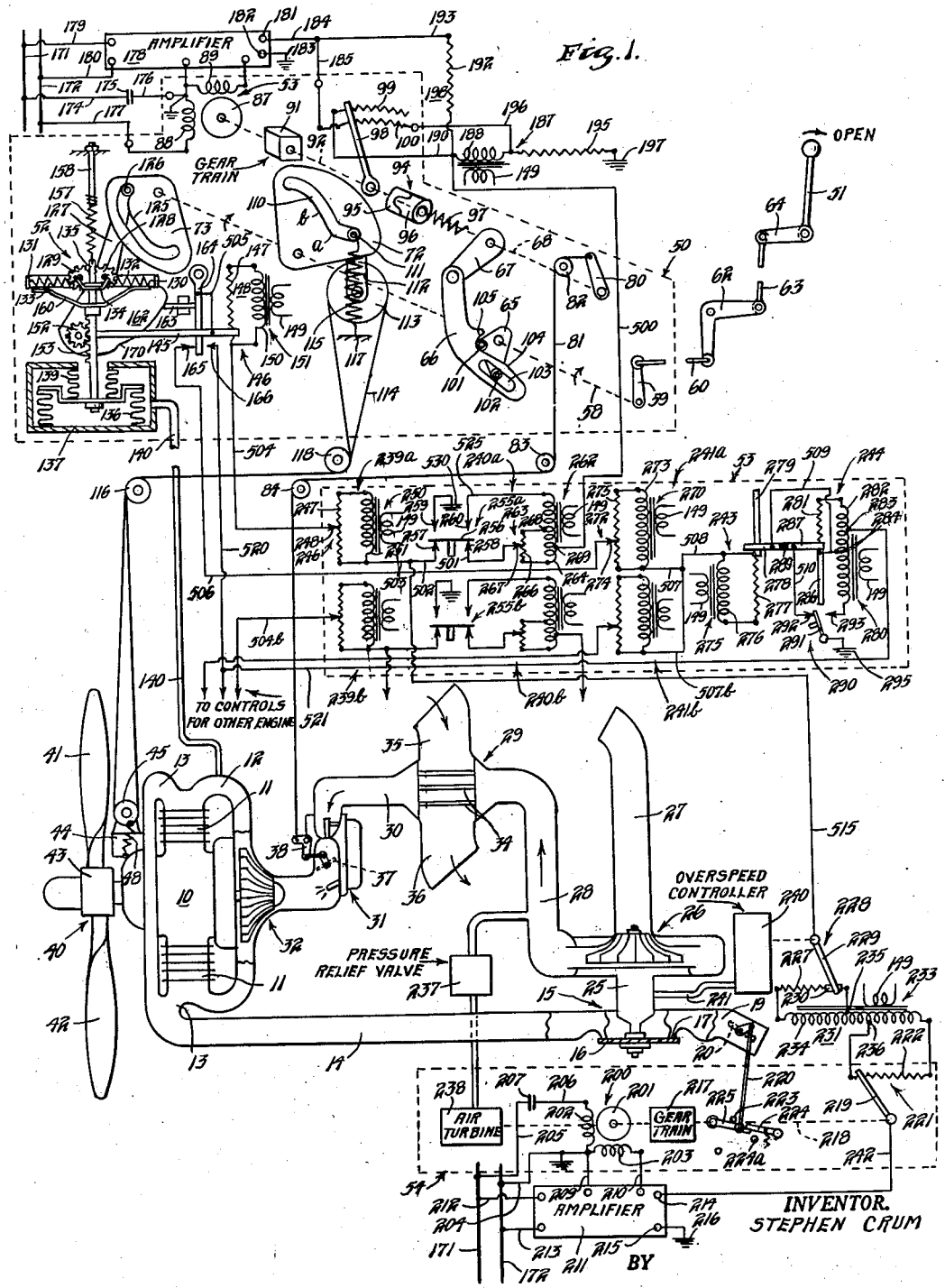

Sept. 30, 1952     S. CRUM     2,612,226
ENGINE POWER CONTROL APPARATUS

Filed April 4, 1946     4 Sheets-Sheet 1

INVENTOR.
STEPHEN CRUM
BY
George H. Fisher
ATTORNEY

Sept. 30, 1952  S. CRUM  2,612,226
ENGINE POWER CONTROL APPARATUS
Filed April 4, 1946  4 Sheets-Sheet 3

INVENTOR.
STEPHEN CRUM
BY
George H. Fisher
ATTORNEY

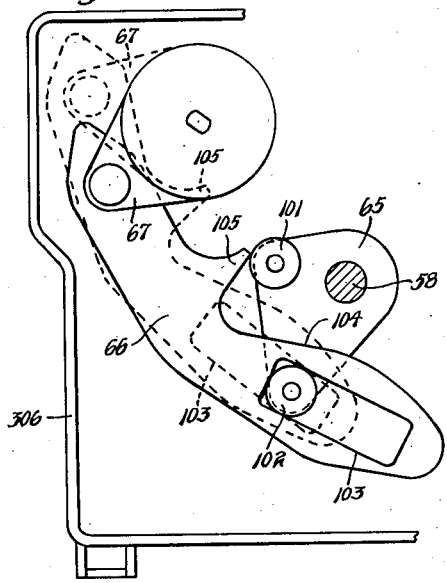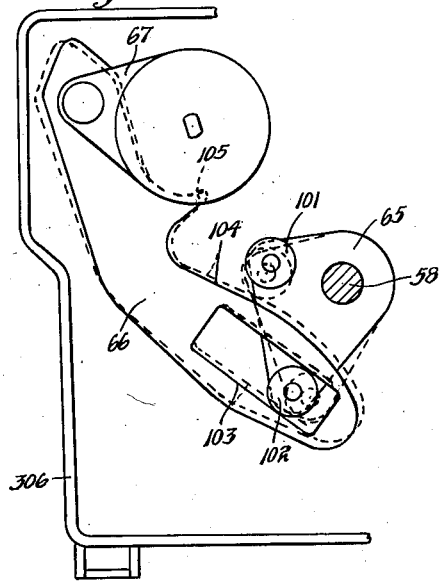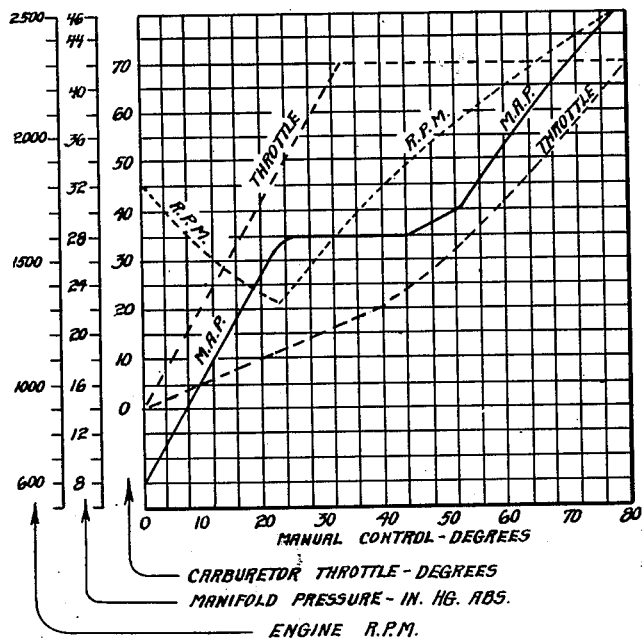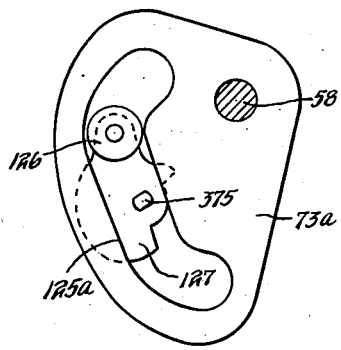

Patented Sept. 30, 1952

2,612,226

UNITED STATES PATENT OFFICE 2,612,226

ENGINE POWER CONTROL APPARATUS

Stephen Crum, Minneapolis, Minn., assignor to Minneapolis-Honeywell Regulator Company, Minneapolis, Minn., a corporation of Delaware Application April 4, 1946, Serial No. 659,651

33 Claims. (Cl. 170—135.74)

The present invention is concerned with engine power control apparatus and more particularly with that of the type in which a single lever is employed to adjust the manifold pressure and the setting of a propeller governor and to position a throttle valve.

It is customary in connection with an airplane to have a propeller governor for maintaining the propeller at any desired speed. Normally, manual means are provided for adjusting this propeller. The throttle of the engine is normally operated by a throttle lever entirely independently of the means for adjusting the propeller governor. In addition, where a supercharger is employed for compressing the air supplied to the engine at higher altitudes, it is customary to provide a control system for maintaining any desired pressure within the induction system of the carburetor or the intake manifold. A manually operable adjusting device is normally provided for varying this pressure. Where the airplane is a multi-engine aircraft, the pilot is compelled to adjust individually the various propeller governors, to separately position the throttles for the various engines and to adjust the control system for the superchargers to maintain the desired manifold pressure. The present invention is concerned with control apparatus in which a single manually operable control associated with each engine, which may be the regular throttle lever, positions the throttle, adjusts a manifold pressure control system which controls both the throttle and the regulator for the supercharger, and also adjusts the propeller governor to maintain a propeller speed desirable for the manifold pressure which is selected.

An object of the present invention, is, accordingly to produce an improved engine power control in which the various factors affecting the engine power can be adjusted by a single lever.

More specifically, an object of the present invention is to provide a manually operable device for operating the throttle through a lost motion connection with automatic means for adjusting the throttle within the range of the lost motion.

A further object of the present invention is to provide in such an arrangement means for adjusting the automatic means by the manual means to maintain a desired manifold pressure.

A further object of the invention is to provide such an arrangement in which the lost motion between the manual control and the throttle varies with the position of the manual control so that despite said lost motion, the throttle is returned to closed position upon the manual control being returned to its minimum power position.

A further object of the present invention is to provide engine power control apparatus in which a manually operable member positions the throttle and varies the setting of a pressure controlling means to control both a throttle and a regulator for the supercharger and in which independent means is provided for varying the setting of the pressure controlling means to cause only the throttle to be operated by the manually operated member.

A further object of the present invention is to provide an arrangement in which there is a single manually positioned member for adjusting both the propeller speed and a pressure responsive impedance network for controlling the manifold pressure in which independent means is provided for varying the pressure setting of the impedance network to vary the relationship between the pressure being maintained and the propeller speed.

A further object of the present invention is to provide an arrangement such as set out in the previous objects in which both the control point and the sensitivity of pressure control are varied by the manually positioned member.

A further object of the present invention is to provide in an engine power control apparatus a novel means for checking the propeller governor by running the throttle motor to open position.

A further object of the present invention is to provide an engine power control apparatus of the type discussed above in which means is provided for adjusting the manifold pressure relative to the propeller speed for any setting of the manually positioned member and in which means is provided for rendering the adjusting means ineffective when the manually positioned member is moved to a position calling for the maximum normal amount of power.

A further object of the present invention is to provide in throttle positioning mechanism, a manually operable member for moving a throttle at a non-linear rate in accordance with the non-linear change of flow with change in position of the throttle, said manually operable member also controlling the setting of a condition responsive system controlling a motor so as also to position the throttle at a non-linear rate.

A further object of the present invention is to provide in a power control apparatus, electrical means for positioning the throttle and a regulator for a supercharger, manual means for positioning a throttle in the event of failure of electrical power, and an air motor for positioning the supercharger regulator in the event of such an electrical power failure.

A further object of the present invention is to provide a novel linkage mechanism in which the lost motion between two members is variable depending upon the relative position of one of the said members.

A further object of the present invention is to provide an engine power control apparatus in which novel means is provided for checking the action of the magnetos, the engine, the propeller governor and the control apparatus.

Figure 2:
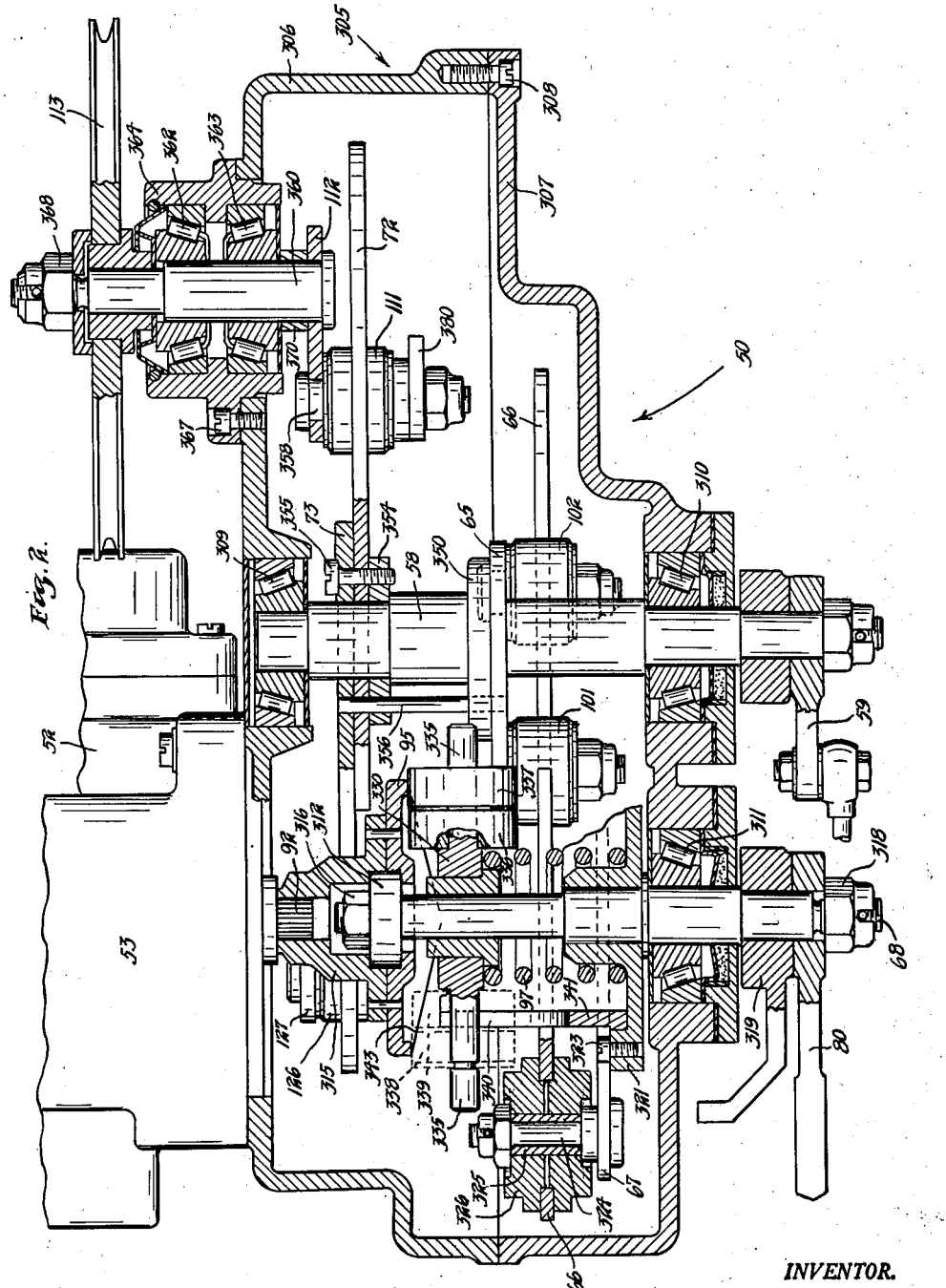
Figure 3:
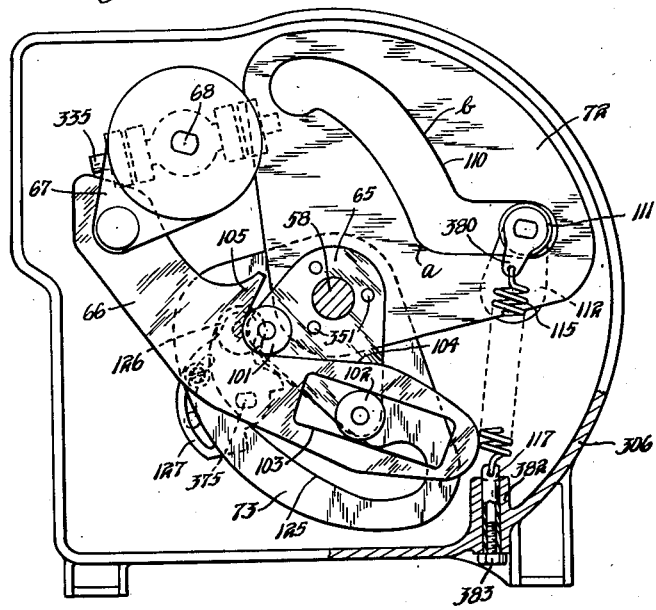
Figure 4:
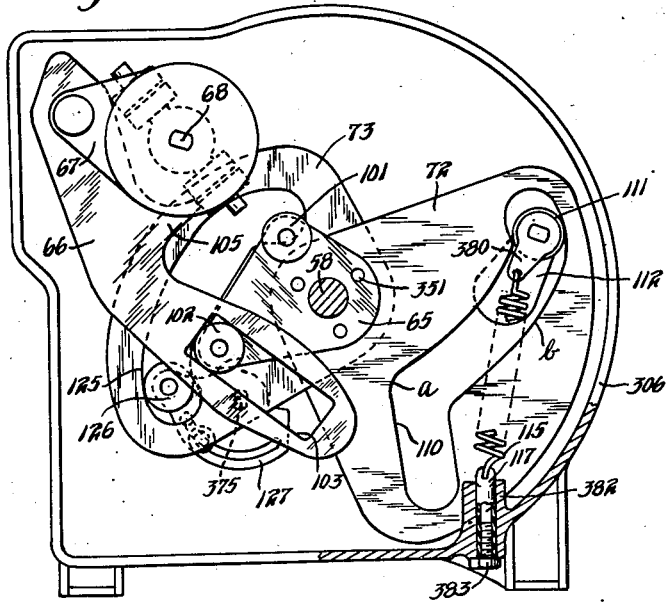

Other objects of the invention will be apparent from a consideration of the accompanying specification, claims and drawing, of which:

Figure 1 is a schematic view of my control apparatus shown in connection with an aircraft, Figure 2 is a horizontal plan view of the coordinating unit of my apparatus with portions shown in section, Figure 3 is a vertical plan view of the cam mechanism of the coordinator unit with the elements in their minimum power or "idle" position, Figure 4 is a view similar to that of Figure 3 but with the elements in the positions which they assume when manually moved to their maximum power or "military" power position, Figure 5 is a plan view showing the throttle cam and an associated linkage in an intermediate manual position with the elements shown in a different relative position in dotted lines, Figure 6 is a plan view similar to that of Figure 5 with the elements shown in solid lines in the relative positions in which they are shown in dotted lines in Figure 5 and with the elements shown in dotted lines in relative positions which they assume when the manual operator is moved in a direction to close the throttle.

Figure 7 is a chart showing graphically the relation between manifold pressure propeller speed, throttle position, and position of the manual operator, and Figure 8 is a view of a modified form of pressure controller cam and associated lever shown in an intermediate position.

Referring to Figure 1, the reference numeral 10 is employed to indicate a radial aircraft engine having a plurality of radially disposed cylinders 11 each connected to an intake manifold 12 and an exhaust manifold 13. Gas from the exhaust manifold 13 is conducted through an exhaust conduit 14 to an exhaust gas turbine 15 having a turbine wheel 16. A nozzle ring 17 is adapted to discharge the exhaust gas in such a manner as to impinge the buckets of the turbine wheel 16 to cause rotation of the latter. The conduit 14 terminates in a discharge duct or outlet 19 in which is located a damper like valve 20 commonly referred to as a waste gate. As the waste gate is opened, the gases may flow past it with less resistance than presented by the turbine so that the gases are by-passed around the nozzle ring and the operating speed of the turbine is reduced. As the waste gate 20 is closed, more and more of the exhaust gas is forced through the nozzle ring 17 to increase the speed of the turbine.

The turbine 15 is connected through a gear box 25 to a supercharger 26. The supercharger is of the centrifugal type in which the extent of compression of the air is varied in accordance with its speed and hence in accordance with the speed at which turbine 15 is driven. Air is drawn into the supercharger 26 through an air intake conduit 27. The compressed air is delivered through a conduit 28 to an intercooler 29. From the intercooler, the air is delivered through a carburetor intake duct 30 to a carburetor 31, where the compressed air is mixed with fuel. The air then passes through a further supercharger 32 which is driven directly by the engine 10. The air then flows through the intake manifold 12 to the various cylinders.

Referring back to the intercooler 29, this comprises a means for removing the heat of compression from the air leaving the supercharger 26. The intercooler comprises a plurality of conduits 34 through which the air is passed and which are disposed in heat exchange relation with air introduced into a scoop 35 and passing through a conduit 36.

Referring to the carburetor 31, the carburetor is entirely conventional and the only element thereof which is of importance as far as the present invention is concerned is the throttle 37 which is operatively connected to a bell crank 38 which upon being rotated in a clockwise direction moves the throttle towards open position. The throttle is shown in the drawing in substantially full closed position.

The engine 10 drives a variable pitch propeller 40 having a plurality of blades 41 and 42. The pitch of these blades is controlled by a propeller governor 43 of conventional form. The propeller governor is provided with adjusting mechanism 44 including a pulley drum 45. A spring 48 is shown as extending between the fixed portion of the adjusting mechanism 44 and a point on the pulley drum 45 such as to bias the drum to a position at which the propeller is set to maintain a speed desirable for cruising. This speed, for example, may be between 1800 and 1900 R. P. M. This spring is normally located within the adjusting mechanism but is shown here as an external spring to simplify the illustration.

The apparatus described so far, in itself, forms no part of my invention. The apparatus of the present invention is concerned with controlling an airplane engine of the type just described. In general, I provide a coordinator unit 50, a pilot's control panel 53, and a waste gate motor 54. The coordinator unit 50 is manually adjusted by means of a conventional throttle lever 51, which may be positioned in the same location as the conventional airplane throttle lever. Upon actuation of this lever, the position of the throttle is directly varied and at the same time, the setting of a pressure responsive device 52 is varied. The pressure responsive device through an electrical network to be described, controls the operation of a throttle motor 53 which also positions the throttle. The pressure responsive mechanism 52 also controls through an electrical network, the waste gate motor 54 to position the waste gate 20. As will appear from the later description, the throttle motor 53 and the waste gate motor 54 are sequentially operated so that the throttle is gradually moved to open position and the waste gate is thereafter moved to closed position. The movement of lever 51 also serves to vary the setting of the propeller governor adjusting mechanism 44 to maintain a propeller speed corresponding to the selected manifold pressure. The pilot's control panel 53 broadly provides means for varying the manifold pressure for any given setting of the throttle lever 51 and for performing certain switching functions incidental to testing of the operation of the engine. The various units of the control apparatus will now be described in more detail.

Referring to the coordinator 50, this is shown in greater detail in Figures 3 to 6 and will be described in detail in connection with these figures. For the purpose of understanding the general operation of the system as a whole, however, the coordinator will be briefly described at the present time in connection with Figure 1. Referring to Figure 1, this is shown as comprising a central shaft 58 to which is secured an input crank arm 59. The crank arm 59 is connected to the throttle lever 51 by any suitable linkage. As illustrated, a link 60 extends between the crank arm 59 and a downwardly extending arm of a bell crank lever 62. The bell crank lever 62 has a horizontally extending arm to which is secured a further link 63 which is pivotally connected to an arm 64 integral with the throttle lever 51. It will be apparent that as throttle lever 51 is moved in a clockwise direction, the shaft 58 is likewise moved in a clockwise direction as indicated by the arrows adjacent that shaft. The shaft 58 has secured to it a triangular crank arm 65 which cooperates with a link 66, the link 66 being in turn pivotally secured to a crank arm 67 secured to a shaft 68. Also secured to the shaft 58 are cams 72 and 73. The cam 72 is employed to adjust the propeller governor and will be referred to as the propeller governor cam. The cam 73 is employed to adjust the pressure controller 52 and will be referred to as the pressure controller cam. The details of the pressure controller are described and claimed in my copending application for "Pressure Responsive Device," filed concurrently herewith. For a more detailed understanding of the operation and construction of the pressure controller 52, reference is made to the aforesaid application. This apparatus is, however, shown schematically in sufficient detail in the present application for a complete understanding of my invention.

Referring to the mechanism including the triangular crank arm 65, this mechanism positions the shaft 68 to which the crank arm 67 is connected. The shaft 68 functions to position the throttle, a throttle crank arm 80 being secured thereto. Secured to the throttle crank arm 80 is a cable 81 which passes over idler pulleys 82, 83 and 84 and is connected to the bell crank 38 in such a manner that movement of the crank arm 80 in a clockwise direction causes movement of the throttle 37 towards open position. It is to be understood that while I have shown a cable 81 connecting the crank arm 80 to the throttle, a linkage mechanism may be employed where desired.

The shaft 68 is also positioned by the throttle motor 53. This motor comprises a rotor 87 with which are associated field windings 88 and 89. The rotor 87 is connected through a reduction gear train 91 to a shaft 92 which is connected through a strain release clutch 94 to the shaft 68. The strain release clutch 94, which is shown in more detail in Figure 2 is shown schematically here as consisting of two members 95 and 96 spring pressed into engagement with each other by a spring 97. The member 95 is provided with a cam surface having a depressed portion 98 into which a corresponding portion of member 96 moves. By reason of this depressed portion 98 in the cam surface of member 95, the members 95 and 96 tend to be held together in a fixed driving relationship with respect to each other. It will be obvious, however, that upon the torque tending to affect relative rotation of shafts 68 and 92 exceeding a predetermined value, relative movement of the shafts will occur by reason of member 96 sliding on shaft 68 and rotating with respect to member 95.

Secured to the shaft 92 is a slider 98 which cooperates with two resistors 99 and 100. The resistance value of resistor 99 is relatively large as compared with that of resistor 100.

Referring now to the triangular crank arm 65, this crank arm carries two rollers 101 and 102. The roller 102 rides within a slot 103 of link 66, while the roller 101 cooperates with a curved cam surface 104 and a horn 105 of link 66. The parts are shown in the position they assume when the throttle lever 51 is in its minimum power position. As the throttle lever 51 is moved to the right to cause clockwise rotation of shaft 58, as previously explained, the roller 101 bears against the horn 105, moving link 66 upwardly and rotating shaft 68 in a clockwise direction. The resultant clockwise movement of the throttle crank arm 80 will cause throttle 37 to be moved towards open position. As the clockwise movement of shaft 58 continues, the roller 101 will ride outwardly on the horn 105. Just as the roller 101 leaves the horn 105, the roller 102 comes into engagement with the end of slot 103. During the further clockwise rotation of shaft 58 and lever 65, the roller 102 remains in engagement with the upper end of slot 103 and transmits movement to link 66 by reason of such engagement. Upon reverse movement of the throttle lever 51 and consequently of crank arm 58, assuming that the shaft 68 tends to remain in the position to which it has been moved, the roller 102 is moved into engagement with the lower end of the slot 103 and moves the link 66 by reason of such engagement. As this counterclockwise rotation continues, roller 101 is brought into engagement with the cam surface 104, rolling on the cam surface in the direction of the horn 105. The final movement of link 66 is caused by the coaction between roller 101 and curved surface 104. By the time that the shaft 58 has been rotated back to the position shown in the drawing, the roller 101 will have moved over this curved cam surface to the position shown in which it is in engagement with the horn 101. In the above described operation, the effect of the throttle motor 53 on the position of shaft 68 has been entirely neglected. The effect of the throttle motor 53 on shaft 68 will be described in more detail in the section in the specification headed "Operation." At this time it may be briefly pointed out, however, that during an intermediate range of positions of shaft 58, an appreciable amount of lost motion exists between triangular crank member 65 and the shaft 68 as will be explained in connection with Figures 5 and 6. It is thus possible for the throttle motor 53 to variably position the throttle within this range of lost motion.

The propeller governor cam 72 is provided with a cam slot 110. Disposed within this slot is a roller 111 secured to crank arm 112 which in turn is secured to a shaft to which is rigidly secured a pulley drum 113. A cable 114 is looped over pulley 113 and pulley 45 of the propeller governing adjusting mechanism 44, the cable 114 passing over idler pulleys 115 and 116. The cam slot 110 extends inwardly from its right-hand end, as shown in the drawing, towards the center of rotation of the cam, reaching the point closest to this center of rotation at point a. Thereafter, it diverges outwardly through a normal cruising point b to its left-hand end as viewed in Figure 1). It will be apparent that as cam 72 is rotated in clockwise direction, the crank arm 112 is first rocked in a counter-clockwise direction until the roller 111 is adjacent point *a*. Thereafter, the crank arm 112 is rotated in a clockwise direction to the end of the range of movement of cam 72. The initial counterclockwise movement of lever 112 causes a corresponding movement of the pulley 113 and hence of pulley 45 of the adjusting mechanism for the propeller governor. This initial movement of pulley 45 in a clockwise direction will be against the effect of spring 48. As the rotation of cam 72 continues to cause clockwise movement of crank arm 112, the pulley 45 is rotated in a clockwise direction, which rotation is assisted by spring 48. At the time that the roller 111 passes a point *b*, the pulley 45 will be in the position to which it is biased by the spring 48. Thereafter, the continued clockwise movement of pulley 45 will be in a direction to oppose the action of spring 48.

A spring 115 has one end thereof secured to the pulley 111 and the other end thereof secured to a support 117, which may be adjustable. The support 117 is so disposed with respect to roller 111 and the axis of crank arm 112 that when the roller 111 is adjacent point *b* of the cam slot 110, the roller 111, the pivot point of crank arm 112, and the point of attachment of spring 115 to support 117 lie in a straight line. Because of this disposition of spring 115, the spring 115 will tend to rotate the cam 72 until the roller 111 is adjacent point *a*. From there until the roller 111 reaches point *b*, the spring 115 will oppose movement of cam 72. At point *b*, the spring 115 will go over center and thereafter will assist in further clockwise motion of cam 72. It will be recalled that when the roller 111 is adjacent point *b* on cam 72, the pulley 45 is in the position to which it is biased by spring 48, this position corresponding to the normal optimum cruising speed. While the cam 72 is being rotated from the position shown to the position in which roller 111 is adjacent point *a*, pulley 45 is being rotated in a counterclockwise direction against the biasing action of spring 48. During this movement, the spring 115 is assisting in the rotation of cam 72. The spring 115 thus opposes the action of spring 48 and hence aids in the movement of cam 72. While the roller 111 is passing from point *a* to *b*, the pulley 45 is being rotated in a clockwise direction and is being assisted in such rotation by the spring 48. During the same movement, the spring 115 is opposing the movement of cam 72. Again, the two springs oppose each other so that the movement of cam 72 is relatively unaffected by the two springs. When the roller 111 is moving between point *b* and the left-hand end of cam slot 110, the spring 48 is opposing the movement of the pulley 45, while the spring 115, having passed over center, is aiding in the movement of cam 72. Thus, again the two springs oppose each other. The result thus, of the spring 115 is to oppose the biasing effect of spring 48 and to cause the movement of cam 72 to be relatively unaffected by this spring 48. If the cable 114 should accidentally be broken, spring 48 will be effective to automatically move the pulley 45 to the normal cruising speed, in the manner which is old in such propeller governors. Thus, the spring 115 effectively counteracts the action of spring 48 as far as the action of the coordinator 50 is concerned without eliminating the usual desirable function of spring 48 in the event of a failure of the mechanism for positioning the pulley 45 of the prop governor adjusting mechanism.

The pressure controller cam 73 is provided with a cam slot 125. Cooperating with this cam slot 125 is a roller 126 secured to a crank arm 127. The crank arm 127 is in turn secured to gear 128 which meshes with a second gear 129. Secured to gears 128 and 129 and rotatable therewith are spring supports 130 and 131, respectively. The outer end of a spring 132 is secured to the outer end of spring support 130 while the outer end of a spring 133 is secured to the outer end of spring support 131. The inner ends of springs 132 and 133 are secured to a yoke member 134 which is secured to a stem member 135. The stem member 135 is positioned by a bellows member 136 which is secured to the lower end of stem 135. Bellows member 136 is located within the housing 137. Surrounding the lower portion of stem 135 and forming an air tight seal between the bellows 136 and the wall of the opening through housing 137 through which stem 135 extends, is a second bellows member 139. A conduit 140 extends between the bellows housing 137 and the intake manifold 12 and serves to cause intake manifold pressure to be applied to the exterior of bellows 136. The bellows 139 not only serve as a sealing member but also serve to compensate the action of bellows 136 in accordance with changes in atmospheric pressure due to changes in altitude of the aircraft on which the apparatus is installed. The function of bellows 139 in this respect will be discussed later.

The stem 135 is employed to position a wiper 145 of a potentiometer 146. Potentiometer 146 comprises, in addition to the wiper 145, a resistance member 147 with which the wiper slidably engages. Connected across the terminals of resistor 147 is a secondary 150 of a transformer 151. The primary of the transformer is designated by the reference numeral 149. The network formed by transformer 151 and potentiometer 146 is referred to generally by numeral 148. The wiper 145 is secured to a gear 152 which meshes with a rack 153 formed in the stem 135. It will be obvious that downward movement of stem 135 will cause a clockwise movement of gear 152 and hence a clockwise movement of wiper 145 with respect to resistor 147. Conversely, an upward movement of stem 135 will cause a counterclockwise movement of wiper 145. An increase in the manifold pressure causes bellows 136 to be compressed to cause stem 135 to move downwardly and cause such a clockwise movement. Thus, on an increase in manifold pressure, the wiper 145 is moved downwardly with respect to resistor 147 while upon a decrease in manifold pressure, the slider 145 is moved upwardly. The force against which the manifold pressure acts is determined by springs 132 and 133 and a further calibrating spring 157. The spring 157 is fastened at its lower end to the upper end of stem 135 and at its upper end to a threaded spring retainer 158 which extends through a fixed support and is adjustably retained in place with respect to said support. For any given adjustment of spring retainer 158, the force exerted by calibrating spring 157 remains constant. The effect of springs 132 and 133 is, however, varied in accordance with the position of crank arm 127 which in turn, of course, is determined by the position of cam 73. As cam 73 is rotated, the radial distance of roller 126 with respect to the center of rotation of cam 73 increases as it follows the cam slot 125. This causes a counterclockwise rotation of the crank arm 127. Such a counterclockwise rotation of crank arm 127 causes the spring supports 130 and 131 to be rotated in a counterclockwise and in a clockwise direction, respectively. In other words, the outer ends of the spring supports 130 and 131 are swung toward each other. This affects the action of springs 132 and 133 in two ways. In the first place, as the outer ends of the springs are swung toward each other, the resultant of their force parallel to the axis of stem 135 is increased so that they exert an increasing effect upon stem 135 tending to move the same upwardly. At the same time, the effective spring rate is also increased. In other words, a much greater force is required to move the stem 135 through a predetermined distance. The effect of this operation is more fully described in my copending application on "Pressure Responsive Device" referred to above. The effect of this will also be discussed in more detail later in this application.

The position of stem 135 is also affected by a leaf spring member 160 which bears against the collar on stem 135 and has two arms adapted to lie in the path of spring supports 130 and 131 when the latter members are rotated apart to a predetermined position. Upon the spring supports 130 and 131 engaging the leaf spring member 160, further movement of the spring supports apart from each other forces the stem 135 downwardly by reason of the force directly exerted between the spring supports and the stem through the leaf spring 160. The function of this will likewise be discussed in more detail later.

Also secured to the crank arm 127 is a cam 162 which cooperates with a slidable pin 163 constituting the actuator of a snap switch, shown schematically in the drawing as comprising a switch blade 164 biased into engagement with one fixed contact 165 and movable with a snap action into engagement with a second fixed contact 166. The cam 162 is provided with a rise which begins at point 170 which is spaced from the point of contact with pin 163 shown in the drawing by an angle of approximately 45°. Upon rotation of the crank arm 127 in a counterclockwise direction, the cam will be effective after approximately 45 degrees of movement to cause switch blade 164 to be moved with a snap action from engagement with contact 165 into engagement with contact 166.

Referring again to the throttle motor 53, the winding 88 is connected to two line wires 171 and 172 leading to a suitable source of alternating voltage such as an inverter (not shown). Line wire 171 is connected to the upper terminal of winding 88 by a conductor 174, condenser 175, and conductor 176. Line wire 172 is connected to the lower terminal of winding 88 by a conductor 177. The condenser 175 functions to shift the phase of the current through field winding 88 by approximately 90°. The other field winding 89 is connected to the output terminals of an amplifier 178. The amplifier is of any suitable type in which the phase of the output voltage is reversible with a reversal in the phase of the input voltage. A typical amplifier of this type is shown in the co-pending application of Albert P. Upton, Serial No. 437,561, filed April 3, 1942. The power input terminals of the amplifier are connected by conductors 179 and 180 to line wires 171 and 172, respectively. The amplifier is provided with two signal input terminals 181 and 182, the latter of which is connected to ground at 183. The input terminal 181 is connected by conductors 184 and 185 to the left terminal of resistor 100.

A transformer 187 is provided with a secondary winding 188 and a primary winding 149. The left-hand terminal of secondary winding 188 is connected by conductor 190 to the left-hand terminal of resistor 99. The left-hand terminal of secondary 188 is also connected through a resistor 192 of relatively high resistance value and conductors 193 and 184 to the input terminal 181. The right-hand terminal of secondary 188 is connected by conductor 196 to the right-hand terminal of resistor 100. The right-hand terminal of secondary 188 is also connected through a relatively high resistor 195 to ground at 196. The transformer 187 together with slider 98 and resistors 99, 100 and 192 constitute a follow-up network referred to generally by the numeral 198. The function of this network will be discussed later. It will be noted that in referring to the primary of transformer 187, the same reference numeral was employed as in connection with transformer 151. In actual practice, a number of the secondary windings employed in this apparatus can form part of the same transformer. In any event, since the apparatus depends upon the proper phase relationship between the various voltages, it is essential that they all be connected to the same power source. To illustrate this, the same reference character is being applied to the primaries of all of the various transformers, it being understood that if desired, these various transformers may be combined into a relatively small number of transformers. They are shown as separate transformers in the illustration merely for convenience in illustration.

The waste gate motor assembly 54 comprises a motor 200 having a rotor 201 and field windings 202 and 203. Winding 202 is the line winding of motor 200 and is connected to line wires 171 and 172 by conductors 204, 205 and 206 and by a condenser 207. Like condenser 175 in connection with motor 53, condenser 207 is effective to shift the phase of the current supplied to winding 202 by 90°. The winding 203 is connected by conductors 209 and 210 to the output terminals of an amplifier 211. This amplifier may be similar in general construction to amplifier 178. In fact, the two amplifiers may form two portions of a two gang amplifier. The power input terminals of the amplifier are connected by conductors 212 and 213 to the line wires 171 and 172. The amplifier 211 is provided with two input terminals 214 and 215. The latter terminal is grounded at 216.

The motor 200 is operatively connected through a gear train 217 to a shaft 218. Secured to the shaft 218 is a crank arm 225. This crank arm is connected by a link 220 to the waste gate 20. It will be apparent that clockwise movement of crank arm 225 is effective to move waste gate 20 towards closed position and, conversely, counterclockwise movement of crank arm 225 causes an opening movement of waste gate 20. Stops are provided to limit the movement of crank arm 225, the stop limiting the opening movement being indicated by numeral 223.

An air turbine 238 is also associated with the waste gate motor 54. This turbine is supplied with air from the discharge conduit 28 of compressor 26 under the control of a pressure relief valve 237 connected on its inlet side to the conduit 28 and connected on its outlet side to the air turbine 238. Also associated with the crank arm 225 is a stop arm 224 biased in waste gate closing direction. The movement of the stop arm is limited by a pin 224a which is effective to prevent the arm 224a from biasing the crank arm 222 beyond a partially closed position of the waste gate 20. The structure of this stop arm 224, the air turbine 238, and the pressure relief valve 237 are more fully disclosed in my co-pending application for "Pressure Control Apparatus" filed March 29, 1946. The operation of this apparatus is also discussed in that application and will be briefly referred to later in this specification.

Also secured to shaft 218 is a slider 219 which cooperates with a resistor 222 of a follow-up potentiometer 221. The slider 219 is connected by conductor 242 to the input terminal 214.

A transformer 233 comprises a primary 149, and a secondary winding 234, this secondary winding being provided with two taps 235 and 236. The resistor 222 is connected across the right-hand portion of secondary 234 between the right-hand end thereof and tap 236.

The left-hand portion of secondary winding 234 between the left-hand thereof and tap 235 is connected across a resistor 227 forming a portion of overspeed potentiometer 228. The overspeed potentiometer 228 comprises a wiper 229 which moves over resistor 227. At one end of the resistor 227, there is a conductive bar 230 with which the wiper 229 is normally in engagement. An overspeed controller 240 is connected by a shaft 241 to the gear box 25 so as to be driven at a speed dependent upon the speed of the turbine 15. The apparatus 240 is designed so that whenever the speed exceeds a predetermined value, the wiper 229 is moved to the left as long as the speed remains above that value. An overspeed controller of this type is shown in the patent to Daniel G. Taylor, No. 2,388,350, issued November 6, 1945. The transformer 233 and the potentiometers 221 and 228 together constitute a rebalancing and overspeed network referred to generally by numeral 231.

The pilot's control unit 53 will now be described. This unit generally consists of a plurality of networks including manually adjustable resistors which are used for calibration and for selection of manifold pressures which are different from those automatically obtained by the manipulation of the throttle. The networks are generally referred to by the reference numerals 239a, 239b, 240a, 240b, 241a, 241b, 243 and 244.

While the details of these networks and the manner of their association in themselves form no part of my invention, being claimed in the co-pending application of Alex B. Chudyk for Engine Control Apparatus, they are described here in order to provide an understanding of the operation of the entire apparatus. The control panel is shown as designed for use in connection with a two engine airplane although it can obviously be employed, by duplicating certain elements, with an airplane having any number of engines. The networks 239a, 240a and 241a are associated with the control mechanism of the engine illustrated in the drawing. The identical networks 239b, 240b and 241b are adapted to be connected into the compound network of a control apparatus for another engine of the same airplane. The bridges 243 and 244 are provided for making simultaneous adjustment of the operation of all of the engines.

Network 239a comprises a potentiometer 246 consisting of a resistor 247 over which moves a manually positioned wiper 248. A transformer 250 comprises a primary winding 149 and a secondary winding 251, the opposite terminals of the secondary winding being connected to the opposite terminals of resistor 247.

A push button switch 255a is interposed between bridges 239a and 240a. This switch comprises a movable switch blade 256 biased into engagement with and bridging a pair of fixed contacts 257 and 258. Upon actuation of the push button, the blade 256 is moved from engagement with contacts 257 and 258 into engagement with a second pair of fixed contacts 259 and 260.

The network 240a consists of a transformer 262 and a potentiometer 263. The transformer 262 comprises a primary 149 and a secondary winding 264. The potentiometer 263 consists of a resistor 266 over which moves a wiper 267. The opposite terminals of resistor 266 are connected between the lower terminal of secondary 264 and an intermediate tap 268.

Network 241a consists of a transformer 270 and a potentiometer 272. The transformer 270 consists of a primary winding 149 and a secondary winding 273. The potentiometer 272 consists of a manually positioned wiper 274 which moves over a resistor 275, the opposite terminals of which are connected to the opposite terminals of secondary 273 of transformer 270. Since the networks 239b, 240b and 241b are identical to the networks 239a, 240a and 241a, it is believed unnecessary to describe these latter networks in detail. Similarly, the switch 255b connected between networks 239b and 240b is identical to switch 255a and hence also need not be described.

The network 243 includes a transformer 275 having a primary winding 149 and a secondary winding 276. Connected across the terminals of secondary 276 is a resistor 277, also constituting part of the network 243. A slider 278 moves over resistor 277 and a bar 279 of high conductivity which constitutes a continuation of resistor 277 beyond the upper terminal of resistor 277 which is connected to secondary 276. Thus, upon slider 278 moving over the conductive bar 279, it remains at the same potential as the upper end of secondary 276.

The network 244 consists of a transformer 280 and a potentiometer having a resistor 281. The transformer 280 consists of a primary winding 149 and a secondary winding 282. The secondary winding 282 has a plurality of taps 283 and 284. The resistor 281 is connected between the upper terminal of secondary 282 and the tap 284. A bar 286 of high conductivity is connected to the end of resistor 281 beyond the point to which it is connected to tap 284. A wiper 287 moves over resistor 281 and conductive bar 286. The two wipers 278 and 287 are connected together physically so as to move in unison, although being electrically separated by insulating material 289. While the two sliders 278 and 287 are being moved through the range of movement in which slider 278 contacts resistor 277 (the normal control range), the slider 287 is moving over the conductive bar 286 and remaining at the potential of tap 284.

A switch 290 is associated with the network 244. This switch, which will be referred to later as an engine check switch, comprises a switch blade 291 biased into engagement with a fixed contact 292. The switch blade 291 is actuated by a push button and is movable into engagement with a second fixed contact 293. The contact 292 is connected to the slider 287 while the contact 293 is connected to the lower end of secondary 282. The switch blade 291 is connected to ground at 295.

In the preceding description, the sturcture of the coordinator 50 has been briefly described on the basis of the schematic showing of Figure 1. As previously indicated, this coordinator unit is shown in more detail in Figures 2–6. At this time, these figures will be described. It is to be understood, of course, that the elements in Figures 2–6 will be indicated by the same reference characters as were employed in connection with Figure 1.

Referring first to Figures 2 and 3, the various elements of the coordinator mechanism are either located within or secured to the outside of a housing 305 consisting of two sections 306 and 307 which are removably fastened together by any suitable fastening means 308. The shaft 58, to which the input crank arm 59 is secured, is rotatably supported in two tapered roller bearings 309 and 310, located in the housing sections 306 and 307, respectively. The opposed tapered roller bearings are provided because they are able to withstand the vibration to which the coordinator unit is subjected by reason of engine vibration. The throttle crank shaft 68 is mounted at its outer end in a similar tapered bearing 311. At its inner end, it is disposed within a ball bearing, the retainer only of which is shown and designated by numeral 312. Bearing 312 is supported by the cam member 95 and a collar member 315 rigidly secured to the motor shaft 92 of motor 53. The collar 315 is secured in driven relation to the motor shaft 92 and is fastened to the cam member 95 so that the cam member 95, the collar 315 and the motor shaft 92 revolve together. A nut 316 is secured to the extreme inner end of shaft 68 to retain shaft 38 in place with respect to bearing 312. The throttle crank arm 80 is rigidly secured to the throttle shaft 68 and is held in place by a nut 318. A stop arm 319 is interposed between the crank arm 80 and a shoulder on shaft 68 and cooperates with any suitable adjustable stop means (not shown) to limit the travel of the throttle crank shaft 68.

A collar 321 is secured to shaft 68 so as to be nonrotatable with respect to the shaft. A hub portion of crank arm 67 surrounds an inwardly extending shank portion of collar 321. The crank arm 67 is held against rotation with respect to collar 321 by stud screws 323, only one of which is shown in the drawing. Secured to crank arm 67 is a pivot pin 324 which extends through a bearing 325 located within a bearing retainer 326 secured in the end of link 66. Link 66, in turn, cooperates with rollers 101 and 102 carried by crank arm 65 secured to shaft 58, as best shown in Figure 3. While bearing 325 is shown for purposes of illustration as a sleeve bearing, any suitable bearing, such as opposed ball bearings, may be employed.

Slidably supported on shaft 68 by a bearing 330 is a roller carrying shaft 335. Disposed on the right-hand portion of the shaft, as shown in Figure 2, are two rollers 336 and 337. Similarly disposed on the left-hand side are two rollers 338 and 339, which are shown only in dotted lines. The outer rollers 337 and 338 bear upon a cam surface of cam 95. The inner rollers 336 and 339 are slidably disposed within a slot 340 of a sleeve 341 secured to collar 321 so as to be rotatable therewith. The spring 97, referred to in connection with Figure 1, bears against the arm 335 and urges rollers 337 and 338 into engagement with the cam 95. A numeral 343 is employed to designate the cam surface of cam 95. It will be noted that this cam surface rises to a high point half way between the location of rollers 337 and 338 when they are in the position shown in the drawing. In other words, the rollers 337 and 338 are shown in the low point of the cam. This is the position to which they tend to move by reason of the bias applied by spring 97. Upon the torque between motor shaft 92 and the throttle crank arm shaft 68 exceeding a predetermined value, the rollers 337 and 338 are forced to ride upwardly on the cam surface 343 so as to permit relative movement between shafts 92 and 68. Upon the rollers 337 and 338 moving with respect to the cam surface 343, the roller carrying shaft 335 is forced outwardly, the rollers 336 and 339 rolling on the walls of slot 340. This action takes place against the biasing action of spring 97. It will be readily apparent that the roller carrying arm, the cam 95, and the spring 97 form a strain release connection which permits motor shaft 92 to drive throttle shaft 68 as long as the force resisting the rotation of throttle crank shaft 68 does not exceed a predetermined value. It is also to be understood that the roller carrying arm 335 corresponds to the member 96 in the schematic showing of Figure 1.

The triangular crank arm 65 which carries rollers 101 and 102 is secured to a collar member 350 which is rigidly secured to shaft 58 so as to be rotatable therewith. Relative rotation between crank arm 65 and collar 350 is prevented by a plurality of screws 351 (shown in section in Figure 3) extending between the two members.

The shaft 58 extends through apertures in the cams 72 and 73. The cams 72 and 73 are held against the collar 354 by means of a plurality of screws 355 (only one of which is shown). The collar 354 is nonrotatably secured in any suitable fashion to the shaft 58. A dowel 356 extends through the cams 72 and 73, the collar 354, the collar 350, and a cam 65 to hold all of these members against relative rotation with respect to each other and with respect to the shaft 58.

The roller 111 which cooperates with the cam 72 is journaled by any suitable bearing means on a pin 358 which extends through the outer end of crank arm 112. Crank arm 112, is, in turn, rigidly secured on a shaft 360 which is journaled in opposed tapered bearings 362 and 363 housed in a hub member 364 secured by screws 367 (only one of which is shown) to the housing member 306. Rigidly secured to the outer portion of shaft 360 is the propeller cable drum 113 which is held in place by nut 368 threadedly secured to the outer end of shaft 360. The nut 368 serves to clamp together in assembled relation on shaft 360, the cable drum 113, the crank arm 112, the bearings 362 and 363 and a collar 370 interposed between crank arm 112 and the inner race of bearing member 363.

Only a fragmentary portion of the exterior of the pressure controller 52 is shown in Figure 2. The pressure controller is secured to the rear wall of housing section 306 beneath the electric motor 53. As shown most clearly in Figure 4, the crank arm 127 is adjustably secured to a shaft 375 extending into the pressure controller (not shown in Figures 3 and 4). This crank arm 375 carries the roller 126, schematically shown in Figure 1 and best shown in Figure 2.

Reference will now be made to Figures 3 to 6 in which the relative positions of the various cam elements and crank arms associated therewith are illustrated. As previously indicated the elements are illustrated in Figure 3 in the position they assume when the throttle lever is in the fully retarded or idle position. The elements occupy the same relative position in this view as they do in the schematic showing of Figure 1.

Referring first to the triangular crank arm 65, the link 66, and the crank arm 67 secured to shaft 68, it will be noted that the roller 101 is in engagement with the base of the horn 105 and that the roller 102 occupies a position a little more than one-third the distance of slot 103 from the left-hand end thereof.

Referring next to the propeller governor cam 72, it will be noted that the roller 111 is at the right-hand end of the slot 110. Secured to the pin 358 carrying the roller 111 is an arm 380 to which is secured one end of the spring 115. The opposite end of the spring is secured to a pin 117 extending through a boss 382 formed in the housing section 306. The pin 117 is held in place by a stud screw 383. It is to be noted that with the roller 111 in the position shown, the axis of crank 112 lies on a line with spring 115. Thus, upon the slightest rotation of cam 72 in a clockwise direction to rock the lever 112 in a counterclockwise direction, the spring 115 is effective to bias the crank arm for rotation in that direction.

Referring to the pressure controller cam 73, the roller 126 is shown in the extreme left-hand end of the slot 125.

The elements are shown in Figure 4 after the throttle lever has been moved through almost its entire range of movement. It is assumed that the motor 53 has remained deenergized throughout this range of movement so that the movement of the throttle crank arm shaft 68 has been against the action of the strain release connection provided by cam 95 and the roller carrying arm 335. It will be noted that the roller 101 carried by the triangular crank arm 58 is completely separated from the horn 105 and that the roller 102 is in engagement with the left-hand end of slot 103 of crank arm 66. During the final phase of the movement of the triangular crank arm 65, link 66 is moved entirely by reason of engagement of roller 102 with the left-hand end of the slot 103. As a result of the rotation of crank arm 65, the crank arm 67 secured to the throttle crank shaft 68 has been rotated from the position shown in Figure 3 to that shown in Figure 4. The propeller governor cam 72 has been rotated to a point such that the roller 111 is adjacent the left-hand end of the slot 110. In doing this, crank arm 112 was rocked first in a counterclockwise direction with the aid of spring 115 until roller 111 was adjacent the point $a$ of the cam slot 110. The crank arm 112 was then rocked in a clockwise direction against the biasing action of spring 115 until roller 111 was adjacent the point $b$ of the cam slot 110. At this point, the axis of rotation of crank arm 112 was again in line with the axis of spring 115 so that the spring exerted no tendency to rotate crank arm 112. Upon further movement of cam 72, the spring 115 assisted the clockwise movement of crank arm 112 and, as shown in Figure 4, the spring 115 is definitely biasing the crank 112 in a clockwise direction. The function of spring 115 has been explained in connection with Figure 1. It will be recalled that this spring is employed to neutralize the action of the internal biasing spring of the conventional propeller governor so that the movement of cam 72 and hence of the coordinator input shaft 58 is relatively smooth and does not require varying amounts of force for its operation as would be the case if some means for compensating for the biasing effect of the propeller biasing spring were not employed.

With the pressure controller cam 73 in the position shown in Figure 4, the roller 126 is adjacent the right-hand end of the slot 125. In this position, the crank arm 127 is rocked to substantially its extreme counterclockwise position. In moving to this position, the crank arm was rotated in a counterclockwise direction, while the cam 73 was being rotated from the position shown in Figure 3 to one in which the roller 126 had left the inwardly curved left-hand portion of slot 125. Thereafter, as the roller 126 rolled along the first portion of the long intermediate part of slot 126, the rotation of crank arm 127 was relatively small. As the rotation of cam 73 continued so that the roller 126 traveled down the final portion of the main portion of cam slot 126, the crank arm 127 was again advanced reaching its maximum position with the cam 126 in the inwardly curved right-hand end portion of slot 125. The result of this movement of crank arm 127, as best indicated in the chart of Figure 7, is to cause an initial rapid rise in the manifold pressure, a period during which the manifold pressure is maintained relatively constant, and a final period in which the manifold pressure is gradually raised to its maximum value.

The action of the throttle crank arm positioning mechanism is best shown in Figures 5 and 6. In Figure 5, the crank arm 65, the link 66 and the crank arm 67 are shown in an intermediate position to which they have been manually moved by actuation of the input shaft 59. It will be noted that the roller 101 is just leaving the tip of the horn 105 and that the roller 102 has engaged the left-hand end of slot 103. Upon continued clockwise movement of shaft 65, the link 66 is moved by reason of roller 102 bearing against this left-hand end of slot 103. It is also to be noted that at this time, a large amount of lost motion exists between crank arm 65 and link 66. When the elements were in the position shown in Figures 1 and 3, corresponding to the closed position of the throttle, the roller 101 was disposed between the horn 105 and the inclined cam surface 104. Consequently, it was impossible to move link 66 in any direction with respect to crank arm 65. As soon as the roller 101 tends to move out on the horn 105, an increasing amount of lost motion is permitted. Before the roller 101 has reached the position shown in Figure 5, the lost motion between link 66 and crank arm 65 corresponds substantially to the full length of slot 103.

To illustrate the action of the throttle motor in taking up this lost motion between link 66 and crank arm 65, the elements have been shown in Figure 5 in dotted lines in the positions to which they have been moved by the throttle motor driving shaft 92 in rotating the cam member 98. It will be noted that with link 66 in the dotted line position, the roller 102 is close to the right-hand end of slot 103. The position of the crank arm 67 secured to the throttle crank shaft 68 has been substantially advanced in a clockwise direction without any corresponding movement of the triangular crank arm 65.

The amount of lost motion within which the throttle motor may adjust the position of crank arm 58 varies depending upon the position of the crank arm 65 on the input shaft 59. When the triangular crank arm is in the extreme throttle closed position shown in Figures 1 and 3, there is no lost motion between link 66 and crank arm 65, as previously explained. As the crank arm 65 is rotated in a clockwise direction so that the roller 101 rides outward on the horn 105, the lost motion increases as the distance between the horn adjacent the spot where the roller 101 is bearing and the opposite point on the cam surface 104 increases in the direction of translation of beam 66. It will be readily apparent that before roller 101 has reached the outer portion of horn 105, the link 66 can be moved to throttle open position without any movement of crank arm 65. Since the throttle is already in partly open position anyhow, the amount of lost motion is only from a partially open position to a full open position. Throughout the rest of the range of movement of crank arm 65, the motor is able to move the throttle to full open position. The amount of lost motion through which the motor is able to operate the throttle, however, is continually decreasing since the open position to which the crank arm 65 has forced the valve is continually increasing so that the distance between the manual position of the valve and full open position is decreasing continually. When the throttle lever reaches full throttle open position, even though the roller 102 is at the left-hand end of slot 103, it is impossible for the throttle motor to move the throttle for the simple reason that the throttle is already in wide open position and the throttle lever is in engagement with stop means (not shown). Thus, the linkage mechanism provides for a range of automatic adjustment which increases from a minimum to a maximum at some intermediate position of the throttle lever and then gradually decreases to a minimum as open position of the throttle is reached. This is graphically shown in Figure 7 and will be discussed in connection with that figure.

In Figure 6, the link 66, the crank arm 65, and the crank arm 67 are shown in solid lines in the positions in which they are illustrated in dotted lines in Figure 5. In other words, the throttle motor has advanced the link 66 by reason of the lost motion existing between roller 102 and slot 103 beyond the position called for by the crank arm 65. It will now be assumed that the crank arm 65 is rotated in a counterclockwise direction to close the throttle despite the position of the throttle motor. Upon the crank arm 65 being rotated in a counterclockwise direction, the roller 101 is brought into engagement with the cam surface 104 as shown in dotted lines. Simultaneously, the roller 102 is brought into engagement with the right-hand end of slot 103 although the operation does not require such engagement. The parts thus assume the position shown in dotted lines in Figure 6. If some means were not provided for taking up the lost motion between roller 102 and slot 103, continuous counterclockwise movement of crank arm 65 would result in the throttle being at its intermediate position when the throttle lever 51 was finally moved to throttle closed position. With my linkage, however, the amount of lost motion between roller 102 and the slot 103 is taken up as the crank arm 65 is rotated. This is due to the cooperation between roller 101 and cam surface 104. As the crank arm 65 is rotated in a counterclockwise direction, the roller 101 rolls inwardly on the cam surface 104 until it finally reaches the position shown in Figure 3 in which the roller 101 is in engagement with the base of the horn. During this movement, the roller 102 is moved along the slot 103 from the position shown in dotted lines in Figure 6 to the position shown in Figure 3. In other words, the roller 102 has moved through nearly two-thirds of the distance of slot 103. With my novel linkage, it is thus possible to manually move the throttle from closed to open position and back to closed position by providing a range of lost motion during intermediate positions of the lever, which range of lost motion in no way interferes with the relation between the throttle position and the throttle lever position when the throttle is in either open or closed position.

As previously referred to, I have shown in Figure 7 graphically, the relationship between the position of the throttle, the engine speed, and the manifold pressure with respect to the angular position of the manual control. In the case of the propeller speed, it will be noted that the speed decreases from a value of approximately 1800 to a minimum of between 1300 and 1400 revolutions per minute. Thereafter, it increases gradually over a curved line up to the maximum speed of 2500 revolutions per minute. The minimum point at which the speed is between 1300 and 1400 R. P. M. corresponds to the point at which the roller 111 is adjacent point $a$ on cam 72.

The manifold pressure initially increases from a minimum of approximately 8 inches of mercury to 28 inches. This is accomplished while the roller 126 is traveling over the steeply curved portion of the left-hand end of cam slot 125 of cam 73. The manifold pressure is then maintained constant for a short distance, shown in the chart as being from approximately 25 degrees to approximately 45 degrees of angular movement of the manual control. Starting at about 45 degrees, the manifold pressure starts rising slowly and finally at a point corresponding approximately to 53 degrees, the manifold pressure starts rising rather rapidly up to its maximum value of 46 inches.

Referring now to the action of the throttle, it will be noted that the throttle opens at a relatively slow rate up to 40 degrees. In the chart, the opening movement of the valve is indicated by the lowermost dotted line. The initial portion of this line appears in the chart to be a straight line although in actual practice it is sinusoidal. Due to the slight curvature, however, it is not apparent on the chart. At an angular position of 40 degrees, the opening of the throttle follows a somewhat steeper sinusoidal curve. The two ranges of curvature corresponds to those produced when the movement of link 66 is due to the engagement of roller 101 with horn 105 and that when roller 102 is engaging the left-hand end of slot 103. The two stages of movement are so selected as to give an opening of the throttle with change in position of the manual control corresponding approximately to the change in flow with change in angular position of the throttle. A butterfly valve such as the throttle valve produces a pronounced change in flow for a small change in angular position as the valve is moving away from closed position. As the valve approaches open position, however, the change in effect on the flow is much less for a given change in angular position. By moving the valve in accordance with two sine curves, an approximation is obtained to the curve representing the relationship between throttle position and flow. Thus, with my apparatus, a uniform change in angular position of the manual control tends to produce a uniform change in the rate of flow.

Considering now the closing movement of the throttle by the manual control, which is indicated by the uppermost dotted line, it will be noted that the throttle remains in open position until the manual control has been returned to a position of approximately 34 degrees. This stage of movement of the manual control corresponds to that in which the roller 101 is being carried down into engagement with the cam surface 104. Thereafter, the throttle is rapidly moved towards closed position, this motion being produced by the roller 101 moving over the cam surface 104. The area enclosed by the curve representing the movement of the throttle towards open position and the lines representing the movement of the throttle towards closed position is the area within which the automatic control means can adjust the position of the throttle. As was pointed out in connection with a description of Figure 5, the range of automatic adjustment increases from a minimum to a maximum at approximately 34 degrees and then gradually decreases up to the end of the range of throttle movement.

OPERATION

Operation of control networks

Before proceeding with the description of the entire system, the operation of the control networks for motors 53 and 200 will first be described.

As previously explained, the winding 88 of throttle motor 53 is connected through a condenser to line wires 171 and 172. The other winding of the motor is connected to the amplifier 178. Due to the condenser 175, the current through winding 88 is displaced 90 degrees from the phase position which it would otherwise assume. The amplifier 178 is adapted, depending upon the phase of the signal voltage supplied to it to supply current to winding 89 which is either 90 degrees behind or 90 degrees ahead of the current supplied to winding 88. The input signal voltage supplied to amplifier 178 is determined by a plurality of networks connected in series with the input terminals, all of which have been briefly described. Proceeding from the input terminal 181 a circuit can be traced as follows: through conductor 184, the throttle motor rebalancing network 198, conductor 500, network 240a, conductor 501, switch 255a, conductors 502 and 503, network 239a, conductor 504, pressure responsive network 148, conductor 505, switch blade 164, contact 165, conductor 506, network 241a, conductors 507 and 508, network 243, conductor 509, network 244 and conductor 510, switch contact 292, switch blade 291 and ground connections 295 and 183 back to the other signal input terminal 182. All of these various networks are connected in series between the input terminals and the amplifier. It will be noted thus, the voltage applied to the amplifier is equal to the algebraic sum of the voltage outputs of these various networks. In a condition of balance, the total voltages are equal to zero so that no input voltage is applied to the amplifier and hence no current is supplied to the amplifier winding 89 of the motor 53. The various transformers forming units of the several networks have such a phase relation with respect to each other that during any given half cycle, the polarity of the lower ends of all the vertically disposed secondaries with respect to their upper ends is exactly the same as that of the left-hand ends of all the horizontally disposed secondaries with respect to their right-hand ends. To understand the voltages appearing across the various networks, let the conditions be considered during which the lower terminals of all vertically disposed secondaries are positive with respect to their upper ends and the left-hand terminals of all the horizontally disposed secondaries are positive with respect to their right-hand ends. Considering first the follow-up network 198, it will be noticed that conductor 184 is connected through conductor 185, slider 98 and conductor 190 to the left-hand terminal of secondary 188. This left-hand terminal of secondary 188 constitutes one of the output terminals of the network, to which conductor 500 leading to network 248 is connected. Thus, no voltage whatsoever appears between conductors 184 and 500.

Considering now the network 248, it will be noted that the slider 267 occupies a position substantially corresponding to the position of a tap 269 of secondary 264 to which conductor 500 leads. Thus, the slider 267 is at the same electrical potential as tap 269 so that no voltage is introduced by network 248.

Considering the next network 239a, it will be noticed that the conductor 503 extending to the network is connected to the positive terminal of secondary 250 (still considering the conditions during a given half cycle). The slider 248 is, on the other hand, positioned half way along the resistor 247. Thus, the conductor 503 is at a positive potential with respect to conductor 504.

The conductor 504 is in turn connected to the lower terminal of secondary 150 of network 148 while conductor 505 leading from network 148 is connected to the slider 145 which is at the bottom of resistor 147. Thus, no voltage is introduced by network 148.

Proceeding through conductor 505, switch blade 164, contact 165 and conductor 506, the next network in the group of series connected networks is network 241a. In the case of this network, conductor 506 is connected to slider 274 which is considerably negative with respect to the lower terminal of secondary 273 to which conductor 507 is connected. Thus, the effect of network 270 is to introduce a voltage tending to render conductor 506 negative with respect to conductor 507. It will be noted that the polarity of this voltage is opposite to that of the voltage introduced by network 239a. The voltages applied to these respective networks are such that the voltage introduced by network 241a is exactly equal and opposite to the voltage introduced by network 239a. Thus considering all of the networks so far, the conductor 507 is at exactly the same potential as conductor 184 connected to the amplifier terminal 181.

Proceeding further through the compound network formed by the group of series connected networks, conductor 507 is connected through conductor 508 to the upper terminal of secondary 276. The slider 278 is shown in a position at which it is at the same potential as the upper terminal of secondary 276 so that no voltage is introduced by network 243. The slider 278 is connected through conductor 509 to the lower or positive terminal of resistor 281. The slider 287 is positioned adjacent this terminal so that the slider is at the same potential as conductor 509. Thus, no voltage is introduced by network 244. Proceeding now from slider 287, conductor 510 connected to it is connected through the switch 290 and ground connections 295 and 216 to the other input terminal 182. Thus, the voltages across the various networks connected in series between input terminals 181 and 182 of amplifier 178 have a total effective value of zero. Under these conditions, no current is supplied to amplifier 39 so that motor 53 remains stationary.

Still considering the conditions during the same half cycle, let it be assumed that stem 135 moves upward due either to the manifold pressure within housing 137 dropping or to the spring supports 130 and 131 being rotated upward and together to increase the spring tension exerted by springs 132 and 133 on stem 135. The effect of such upward movement of stem 135 will be to cause an upward movement of slider 145 with respect to the resistor 147. This will result in slider 145 becoming negative with respect to the lower terminal of secondary 150 and hence with respect to conductor 504. The effect of this upon the voltage applied between terminals 181 and 182 will be to cause terminal 181 to become positive with respect to terminal 182. In terms of alternating current, this will means that a current of a predetermined phase is supplied to input terminals 181 and 182 and hence to the motor winding 89. The operation of the motor 53 will be in a direction to cause clockwise rotation of shaft 92 and, if permitted by the link 66, clockwise rotation of throttle lever 80 to move the throttle towards open position. Such opening movement is, of course, desirable, either where the manifold pressure has dropped or where the springs 132 and 133 have been adjusted to call for a higher manifold pressure.

The movement of shaft 92 in a clockwise direction causes clockwise movement of wiper arm 98 with respect to resistors 99 and 100. This will cause conductor 185 to assume a potential negative with respect to the left-hand terminal of secondary 188. The effect of this is to oppose the unbalance voltage introduced by the reason of the upward movement of slider 145. At the same time, the increase in manifold pressure causes slider 145 to move downwardly. After a predetermined movement of slider 98, the voltage introduced by network 198 will be equal and opposite to the reduced unbalance voltage so that the input voltage to the amplifier will again be zero.

While my invention broadly contemplates the provision of a follow-up network, the details of network 98 are claimed in the copending application of Alex B. Chudyk, referred to above. Since an understanding of my complete invention involves an understanding of this network, the operation of the follow-up network 198 will be described. The conductor 184 leading from the amplifier 181 to one of the output terminals of the bridge is connected through the left-hand portion of resistor 100 to wiper 98 and is at substantially the same potential as the wiper. Wiper 98 contacts both resistors 99 and 100 and electrically connects the same across the terminals of secondary 188 in a circuit which may be traced as follows: from the right-hand terminal of secondary 188, through conductor 196, the right-hand portion of resistor 100, slider 98, the left-hand portion of resistor 99 and conductor 190 to the left-hand terminal of secondary 188. The potential of conductor 185 with reference to the left-hand terminal of secondary 188 and hence conductor 500 is thus determined by the ratio between the portion of resistance 100 to the right of slider 98 and the portion of resistance 99 to the left of the slider. As slider 98 moves to the right, its potential with respect to the left-hand terminal of secondary 188 is thus increased.

If both resistors 99 and 100 were of the same resistance value, the change in potential would be linear. Due, however, to the fact that resistor 100 has a considerably lower resistance value than resistor 99, the change in potential becomes increasingly less as the slider 98 moves to the right. This will be apparent when it is considered that a change in the position of slider 98 not only changes the relative proportions of the resistance on the right and left-hand sides of the slider between the terminals of secondary 188 but also increases the total resistance between the terminals of the secondary. In a typical installation, the resistors 99 and 100 were 700 and 300 ohms respectively. With the slider 98 in the position shown, the resistance between the opposite terminals of secondary 188 is only 300 ohms. With the slider 98 in the opposite position, the resistance is 700 ohms. The current flowing through the portions of resistors 99 and 100 in series with secondary 188 thus decreases as the slider 98 moves to the right so that the voltages on the right and left-hand sides of the slider are determined not only by reason of the ratio between the amounts of the resistance on the right and left-hand sides but also by reason of the changing voltage drops due to current flow. The net effect is that as slider 98 moves to the right, the change in voltage becomes increasingly less. The values of resistors 99 and 100 are so selected with respect to the voltage of secondary 188 as to produce a non-linear effect corresponding to the non-linear effect on flow resulting from a uniform angular opening of a butterfly valve such as throttle 37. With such a valve as throttle 37, the initial opening movement of the valve produces a rapid change in the flow while as the valve approaches open position, the change in flow of a uniform angular change becomes increasingly less. While my invention broadly contemplates such non-linear movement of the throttle, with the improved network 198, this non-linear movement is accomplished electrically in that the voltage introduced into the amplifier network becomes increasingly less as the throttle is moved towards open position. Thus, during the initial opening movement of the valve, only a very slight change in valve position produces a voltage sufficient to balance a signal of predetermined strength while during the later stages of movement of the valve, an appreciable movement of the valve is necessary to produce the necessary balancing voltage.

In the operation above, the effect of movement of the pressure controller arm 145 upwardly was considered. It would, of course, be obvious that a downward movement of the arm has the opposite effect upon the polarity of the voltage applied between terminals 181 and 182 and hence causes the current to be supplied to winding 89 which is opposite in phase to that considered before. This will cause opposite rotation of the motor 53 to move the throttle 37 towards closed position. At the same time, the slider 98 is moved in the opposite direction to supply an opposite rebalancing voltage to the network. Thus, considering only the operation of the pressure controller 52 the effect of a change in either the manifold pressure or in the setting of the controller is to cause a change in the position of the throttle 37 of a magnitude sufficient to produce a change in flow proportional to the change in manifold pressure or to the change in spring tension of stem 135. The operation of this pressure controller will be referred to again in connection with the waste gate motor 200 and in connection with the system as a whole.

The operation of networks 239a, 240a, 241a, 243, and 244 will be considered later after the operation of the network controlling the waste gate motor 200 is considered. At the present time, it may be briefly pointed out that adjustment of any of these sliders will produce a variation in the position of the throttle maintained for a given position of the slider 145 of the pressure responsive apparatus.

Referring now to the waste gate motor 200, the winding 202 is, as previously pointed out, connected through the condenser 207 to the line wires 171 and 172. This winding is thus constantly energized with the current displaced in phase 90 degrees with respect to what its phase position otherwise would be. The winding 203 is connected to the output terminal of an amplifier 211 and is energized with current which either leads or lags the current through winding 202 by 90 degrees, depending upon the phase of the voltage applied between the input terminals 214 and 215 of amplifier 211. This voltage is determined by a second compound network which includes a plurality of networks some of which are common to the throttle motor compound network previously traced and others of which are present only in the waste gate network. Proceeding from input terminal 214, this compound network may be traced as follows: through conductor 242, the rebalancing and overspeed network 231, conductors 515, 503, network 239a, conductor 504, pressure responsive network 148, conductor 505, switch blade 164, contact 165, conductor 506, network 241a, conductor 507, network 243, conductor 509, network 244, conductor 510, switch 290, and ground connections 295 and 216 back to the other input terminal 215. It will be noted that the compound network just traced included the network 239a and the pressure responsive network 148, previously considered. The pressure controller 52 thus controls not only the throttle motor 53 but also the waste gate motor 200. As will be clear from the later description, upon a continued demand for increased manifold pressure, the throttle motor is first moved to open position, and thereafter the waste gate is moved towards closed position.

As with the various networks of the throttle motor compound network, the polarities of the left terminals of the horizontally disposed secondaries are always the same with respect to the right terminals of the secondaries as those of the lower terminals of the vertically disposed secondaries with respect to their upper terminals. Considering now the conditions existing during a half cycle in which the left-hand terminals of all of the secondaries and the lower terminals of all of the secondaries are positive and proceeding from input terminal 214 through conductor 242, it will be noted that slider 219 is at the extreme left-hand end of resistor 220 so that the conductor 242 is at the same potential as tap 236. Similarly, slider 229 is at the right-hand end of resistor 227 so as to be at the same potential as tap 235. Thus, conductor 242 is negative with respect to conductor 515 by the amount of the voltage existing between taps 235 and 236. The conductor 515 is in turn connected through conductor 503 to the lower terminal of secondary 251 of network 239a. It will be noted that the slider 248 is negative with respect to the lower terminal of secondary 251 so that conductor 503 tends to be rendered positive with respect to slider 248 and hence with respect to conductor 504. The voltage introduced by network 239a thus opposes that introduced by network 231. In actual practice in a typical installation, the voltage introduced by network 239a is greater than that between taps 235 and 236 and hence introduced by network 231. Hence, the conductor 242 connected to input terminal 214 is positive with respect to conductor 504.

Proceeding now to the network 148, the slider 505 is at the lower end of resistor 147 so that the potential introduced thereby is negligible. From slider 145, the circuit proceeds through conductor 505, switch 164, contact 165 and conductor 506 to the network 241a. The slider 274 is negative with respect to the lower end of secondary 273 to which conductor 507 is connected. Thus, the voltage introduced by network 241a opposes that introduced by 239a and aids that introduced by network 231. In the typical installation referred to above, with the sliders in the position shown, the voltage introduced by network 241a exactly balances that introduced by network 239a so that conductor 507 is at a positive potential with respect to conductor 242 by a voltage corresponding to the voltage existing between taps 235 and 236.

Proceeding from network 241a, the circuit extends through conductors 507, 508, network 243, conductor 509, network 244, switch 290 and ground connections 295 and 216 to the other input terminal. It will be recalled that no voltage exists across the output terminals of either networks 243 or 244. Hence, ground connections 295 and 216 are at the same potential as conductor 508, which it will be recalled is positive with respect to conductor 231 connected to the terminal 214. In other words, terminal 214 is negative with respect to terminal 215. The effect of this voltage on the amplifier 211 is to cause current to be supplied to motor winding 203 of such a phase as to cause rotation of motor 200 in a direction to move the waste gate towards open position. The waste gate 20 is already in open position and the crank arm 222 is prevented from further opening movement by stop 223. A suitable slip clutch (not shown) is provided between the motor and crank arm 222 to prevent injury of this motor under these conditions.

If under the conditions just considered, the manifold pressure drops sufficiently or the setting of the pressure controller is raised sufficiently to cause an upward movement of slider 145 to a point with respect to resistor 147 in which the voltage between the slider 145 and the lower terminal of secondary 150 exceeds the voltage between taps 235 and 236, the terminal 214 will no longer be negative with respect to terminal 215 during the conductive half cycle being considered. The phase of the current supplied to winding 203 will then be reversed and the motor will rotate in a direction to cause closing movement of the waste gate 20. This will cause movement of slider 219 to the right to introduce into the series connected networks a voltage opposing the unbalance voltage introduced by the pressure responsive network 148. The closing of the waste gate will increase the manifold pressure to decrease the voltage across network 148 and hence reduce the unbalance voltage. After a predetermined movement of the waste gate, this rebalancing voltage will equal the reduced unbalance voltage and the series of networks will again be rebalanced to cause deenergization of the motor 200. This operation of the waste gate motor does not normally occur, however, until the throttle motor has moved to a position at which the throttle is substantially open.

The operation of some of the controllers of the pilot's control unit 53 will now be considered. The networks 243 and 244 are employed to vary the manifold pressure for the two engines being controlled. For the present, the effect on only the illustrated engine will be considered. These two networks constitute what may be referred to as the manifold pressure selector. The sliders 278 and 287 are normally moved through a range of movement which carries the slider 278 over the full length of the resistor 277. The range of movement during which slider 287 moves over resistor 281 is employed only in emergency conditions where extremely high manifold pressures are desired. This range of movement provides manifold pressure which cannot be maintained for long periods of time without severe damage to the engine.

Considering the operation during the half cycle which has been used for illustrative purposes throughout the specification, that is in which the lower ends and the left-hand ends of all secondaries are positive with respect to their opposite ends, a movement of slider 278 downwardly with respect to resistor 277 will cause conductor 508 to become negative with respect to slider 278. Since the slider 278 is connected to ground through conductor 509, slider 287, conductor 510 and switch 290, it will be obvious that the effect of causing conductor 508 to become negative with respect to slider 278 is to cause the ungrounded input terminals 181 and 214 of amplifiers 178 and 211 respectively to become less positive or more negative with respect to the grounded terminals 182 and 215 respectively than was previously the case. It will be recalled from the operation described above, that in the case of either amplifier 178 or 211, a change of the polarity of the ungrounded input terminal in the negative direction tended to produce a movement of the control device positioned by the associated motor in a direction to decrease the manifold pressure. That is, in the case of the throttle motor 53, the amplifier 178 tended to so energize the throttle motor as to cause it to move the throttle towards closed position. Similarly, in the case of the waste gate motor 200, the effect of changing the polarity of the ungrounded input terminal 214 in a negative direction with respect to the grounded terminal is to cause the motor 200 to be energized in a direction to drive the waste gate towards open position. Thus, as slider 278 is moved downwardly with respect to resistor 277, the effect of such movement is to cause the waste gate and throttle to assume positions such that the manifold pressure is reduced. The lowermost positions of slider 278 with respect to resistor 277 may be referred to as constituting the approach and preflight range. The slider 278 is shown in its normal position.

If the sliders 278 and 287 are moved upwardly to the point where slider 287 moves over resistor 281, the conductor 509 which is connected between resistor 281 and a conductor bar 286 becomes positive with respect to slider 287 which is connected to ground, as previously explained. Thus, the effect of movement of slider 287 from the position shown is to increase the polarity of ungrounded input terminals 181 and 214 in a positive direction with respect to the grounded terminals of the respective amplifiers. This tends to cause the motors associated with these amplifiers to so position the associated control devices as to increase the manifold pressure. Thus, a movement of slider 287 upwardly with respect to resistor 281 raises the manifold pressure. As previously explained, slider 287 is normally not moved over the resistor 281. This range of adjustment is used only when an emergency condition exists requiring the maximum output of the engine even though this output is greater than can be maintained with safety for any appreciable period of time.

The networks 241a and 241b are provided for individually adjusting the manifold pressure of the two engines. Both conductor 507 leading from network 241a and conductor 507b leading from network 241b are connected to the networks 243 and 244 so that, as previously explained, the adjustment of the latter two networks controls the effect of both engines. Considering the network 241a which is associated with the engine illustrated in the drawing, it will be apparent that a movement of slider 275 upwardly tends to cause conductor 506 connected to the slider to become more highly negative with respect to conductor 507. This causes change of the polarities of the ungrounded input terminals 181 and 204 of the two amplifiers in a negative direction with respect to the ungrounded terminals so as to cause a reduction of manifold pressure. Similarly, a movement of slider 274 downwardly with respect to resistor 275 increases the potential of input terminals 181 and 204 in a positive direction and causes the manifold pressure to rise. Thus, the adjustment of the slider 274 causes the manifold pressure to be adjusted independently of the setting of the lever 51. The potentiometer 272 is thus employed to individually adjust the manifold pressure of the engine shown independently of the position of throttle lever 51 and is referred to as a manifold pressure vernier potentiometer.

Proceeding back to the positive terminals of the amplifiers, conductor 506 leading from the slider 274 of the manifold pressure vernier extends through contact 165 and switch blade 164 to the pressure responsive network, the operation of which has previously been considered. From this network, a conductor 504 leads to the networks 239a. Considering the operation of the potentiometer 246 of this network, it will be apparent that a movement of slider 248 upwardly causes the ungrounded input terminals of the two amplifiers to become more positive with respect to the grounded input terminals and hence to cause the manifold pressure to be increased. Conversely, a downward movement of slider 248 causes a decrease in manifold pressure. The potentiometer 246 thus is similar to potentiometer 272 in that it individually adjusts the manifold pressure for the particular engine with which it is associated. The purpose of providing both networks 239a and 241a is to provide for independent calibration of the system at different positions of the throttle lever 51. The network 239a is employed for calibration purposes when the lever 51 is in the position assumed when the airplane is taking off or what may be referred to as the military power position. The potentiometer 246 is thus referred to as the military power calibrator.

The networks 243, 244, 241a and 239a, together with the pressure responsive network 148 are all common to the series of networks associated with the throttle motor amplifier and with the series of networks associated with the waste gate motor amplifier. The remaining networks to be considered are associated only with one or the other of these amplifiers.

Considering first those associated with the throttle motor amplifier 178, the network 240a is normally employed for varying the relative position between the throttle and waste gate for any given setting of the other controls. If slider 267 of potentiometer 263 of this network is moved up, the effect will be to increase in a positive direction the potential of input terminal 181 of amplifier 178 with respect to the grounded input terminal 182. In other words, with slider 267 in the position shown, no voltage is introduced into the throttle motor amplifier series of networks, as previously explained. With the slider 267 moved up, however, the potential of conductor 500 and hence of input terminal 181 is increased in the positive direction. As previously explained, such movement tends to cause an opening movement of the throttle. Obviously, downward movement of slider 267 causes a closing movement of the throttle. It is also to be noted that since this network is not connected in series with the input terminals of the waste gate motor amplifier, the setting of this slider has no effect whatsoever on the waste gate. Thus, by moving slider 267 the relative positions of the throttle and waste gate can be changed. It is often desirable to have the waste gate partly closed even when the throttle is not fully open in order to utilize the heat of compression for heating the carburetor. Furthermore, the adjustment provided by potentiometer 263 makes it possible to calibrate the system when the lever 51 is in cruising position, as will be explained in more detail later. For this reason, this potentiometer may be referred to as the cruise calibrator.

The series of networks for the throttle motor amplifier 178 also includes the follow-up network 198, previously discussed. It is not believed that any further discussion of this network is necessary at the present time.

Considering now the series of networks connected to the waste gate amplifier, the operation of the network 231 has been described so far as the action of follow-up potentiometer 221 is concerned. Considering now the overspeed potentiometer 228, the wiper 229 is, as previously stated, normally in the extreme right-hand position shown in the drawing. Upon the occurrence of an overspeed condition, however, the overspeed controller 240 is operative to move the wiper 229 to the left. Such movement to the left tends to cause conductor 242 to be more negative with respect to conductor 515. Thus, the polarity of input terminal 214 of amplifier 211 is made more negative with respect to grounded terminal 215, or if the terminal is already positive with respect to terminal 215, is made less positive. The result is that the motor 200 tends to rotate the waste gate in open direction to reduce the speed of the turbine. Since the purpose of the overspeed controller 240 is to prevent an excessive speed of the turbo supercharger, it is obviously unnecessary to have this control affect the throttle motor.

With the above explanation of the normal operation of the throttle motor 53 and the waste gate motor 200 in mind, it is now possible to explain broadly the normal operation of the system. Various checking features are provided and for the present, these will be ignored.

Operation of entire system

With the elements in the position shown in Figures 1 and 3, the throttle is completely closed and the waste gate is wide open. The throttle lever 51 has been moved to its extreme minimum power position which is at the lower end of what may be referred to as the "Idle Range." Assuming the plane to be on the ground, in order to start the engine it is necessary to slightly open the throttle. This is done by a slight movement of lever 51 in a clockwise direction. Such clockwise movement of the lever 51 causes a clockwise movement of shaft 58 and a clockwise movement of crank arm 65 to, in turn, cause a clockwise movement of shaft 68 and throttle crank arm 89, all as previously explained. Such movement of the throttle crank arm 80 causes the throttle 37 to be moved towards open position. The clockwise rotation of shaft 58 also causes a clockwise rotation of cams 72 and 73. The slight clockwise rotation of cam 72 causes a slight movement of the propeller governor pulley 45 in a counterclockwise direction to decrease the propeller speed.

The movement of cam 73 in a clockwise direction causes a counterclockwise rotation of crank arm 127 to swing the spring supports 130 and 131 upwardly. This has two effects. In the first place, the spring supports are moved away from the leaf spring 60 so that there is no longer a relatively rigid mechanical connection between the crank arm 127 and the stem 135. At the same time, the tension exerted by springs 132 and 133 on the stem 135 is increased so as to tend to cause an upward movement of stem 135. This, as previously explained, causes an upward movement of slider 145 with respect to resistor 147. Such an upward movement tends to cause the throttle motor 53 to be energized in a direction to drive the shaft 92 in throttle opening direction. Since it is normally desirable to have manual control of the throttle at this time, the slider 278 of the manifold pressure selector is moved downwardly with respect to resistor 277 before throttle lever 51 is moved towards open position. Thus, despite the movement of the slider 145 of the pressure responsive network, the throttle motor will still remain deenergized, or energized in a throttle closing direction. In such case, the throttle is positioned entirely manually, the strain release clutch permitting the relative slippage of shafts 68 and 92.

With the engine started, various checks are made to insure proper operation of the engine, the propeller governor, and the control apparatus of the present invention. These various checks will be referred to later. Assuming that the engine has been properly warmed up and that the ship is ready for the take-off, the slider 278 of the manifold pressure selector is set to the normal position, which is substantially that shown in the drawing. The throttle lever 51 is then moved to its extreme right-hand position to move the elements of the coordinator to the position shown in Figure 4, which may be referred to as the military power or take-off position. Such movement results in sufficient manual clockwise rotation of shaft 68 to cause the throttles to be moved to their wide open position. At the same time, the propeller governor 72 is rotated to a point at which roller 111 is at the end of the cam slot 110 opposite to that in which it is shown in Figures 1 and 3. At this setting, the propeller governor calls for take-off speed.

This movement of the throttle lever 51 to its extreme right-hand position also causes the pressure controller cam 73 to be rotated to a position in which the roller 126 is at the extreme end of slot 125 opposite to that in which it is shown. This brings the springs 132 and 133 to a position in which they extend substantially vertically so as to exert their maximum effort upon the stem 135.

The rotation of the crank arm 127 by the cam 73 also results in cam 162 being rotated to a position in which the pin 163 is moved to the right by the cam to cause switch arm 164 to move from engagement with contact 165 into engagement with contact 166. The effect of this switch is to remove networks 241a and 243 from the connections to both the throttle motor amplifier 178 and the waste gate motor amplifier 211. The range within which the cam 162 is effective to hold switch 164 in engagement with contact 166 is the military power or take-off range. During this range of powers, it is highly essential that the power be limited essentially to that selected by the throttle lever 51. If the power under these conditions can be effected by the networks 241a and 243, a previous faulty adjustment of these networks may result in inadequate or excessive power during take-off conditions or at other times when military power is needed. When switch blade 164 is moved into engagement with contact 166, the input circuit to amplifier 178 becomes as follows: from input terminal 181 through conductor 184, follow-up network 198, conductor 500, network 240a, conductor 501, contact 258, switch blade 256, contact 251, conductors 502 and 503, network 239a, conductor 504, pressure responsive network 148, conductor 505, switch blade 164, contact 166, conductors 520 and 521, that portion of secondary 282 of network 244 between taps 283 and 284, slider 287, conductor 510, switch 290 and ground connections 295 and 183 to the input terminal of the amplifier 178. It is to be noted that the circuit just traced does not include the manifold pressure vernier potentiometer 272, or either of the manifold pressure selector networks 243 and 244, with the sole exception of a fixed portion of the network 244. The voltage between taps 283 and 284, in one particular embodiment of the invention, corresponds substantially to the voltage between slider 274 and the lower end of secondary 273 of network 241a, when the slider 274 is in the position shown. Thus, the portion of secondary 282 between taps 283 and 284 introduces into the system a voltage substantially the same as introduced by network 241a when the elements are in the position shown. This voltage is one which gives a normally desirable manifold pressure, since original calibration was made with it in the circuit.

The movement of switch 164 from engagement with contact 165 into engagement with contact 166 also alters the waste gate network by the elimination of the manifold pressure vernier networks and the manifold pressure selecting networks, except for the fixed portion of secondary 282. Considering the circuit between the input terminals 214 and 215 of the waste gate motor amplifier, a circuit may be traced from the input terminal 214, through conductor 242, the follow-up and overspeed network 231, conductors 515 and 503, the military power calibrator network 239a, conductor 504, pressure controller network 148, conductor 505, switch blade 164, contact 166, conductors 520 and 521, the portion of the secondary between taps 283 and 284 and back to the ground connection 216 through slider 287 and switch 290 as previously traced.

Thus, by the provision of the military power switch 164, and the circuit connections associated therewith, the power during take-off is determined entirely by the throttle 51 except for the overspeed controller 240, the cruise calibrator potentiometer 263, and the military calibrator potentiometer 246. The military power calibrator is, however, relatively inaccessible and is normally not available for easy adjustment by the pilot. The cruise calibrator potentiometer only controls the position of the throttle which under these conditions is wide open regardless of how the cruise calibrator potentiometer is set. The overspeed potentiometer is operated only when an overspeed condition exists and is necessary. Thus, the power supplied by the engine within this range is subject to rather close control by the throttle lever 51. It is being assumed in connection with the description of the operation under these conditions that the slider 287 is not in engagement with the resistor 281, or, in other words, is not moving into the emergency range. If the slider is so moved, the manifold pressure is, of course, further increased in accordance with the position of slider 287.

After the take-off, the throttle lever is slightly retarded so as to reduce the propeller speed. At take-off, the propeller speed may, for example, be 2500 R. P. M. After take-off, this speed is reduced to 2300 R. P. M., for example. This movement of the throttle 51 will bring it to what may be called the rated power position and will cause sufficient counterclockwise rotation of cam 162 to allow switch blade 164 to return to contact 165 thus restoring control of the manifold pressure selector and the manifold pressure verniers. The pilot may, if desired at this time, adjust the manifold pressure to a value which he feels is more satisfactory for climbing. Such adjustments may be necessary to overcome instrument variations and other variations in the aircraft equipment.

When the airplane has reached the desired altitude, the throttle lever 51 is retarded to an intermediate position within the cruising range. Under these conditions, it is desirable that the slider 278 be in approximately the position shown for maximum fuel economy. The position to which the shaft 58 and the throttle crank arm 89 are manually moved is an intermediate position, under these conditions. At any appreciable altitude, however, in order to maintain in the pressure demanded by the pressure responsive controller 52 under these conditions, the throttle motor 53 will have been affected to drive the throttle to wide open position and, in all likelihood, the waste gate motor 200 will have been affected to drive the waste gate partly to closed position. The further movement of the throttle motor is possible because of the lost motion provided by the slot 103, as explained in connection with Figures 5 and 6. It is to be understood that with slider 278 in the position shown, the throttle motor is always effective to open the throttle further than it is moved directly by crank arm 65.

As the aircraft changes in altitude during cruising conditions, the waste gate and throttle will be adjusted to maintain the desired manifold pressure despite the varying density of the air. In this connection, the feature of bellows 139 is of importance. In any system of a follow-up type such as that employed by applicant in connection with both the waste gate and throttle motors, it is necessary in order to get a change in the position of the controlled device for there to be some change in the controlling condition. Thus, as the load increases, it is impossible to maintain the controlling condition at the exact desired value. The only way to change the control device to take care of the change in load is for the controlling condition to change itself. Thus, applied to the present case, the only way in which it is possible to obtain settings of the throttle and waste gate to produce higher manifold pressures is for the pressure to drop. As the atmospheric pressure decreases with higher altitudes, an increasing drop in manifold pressure thus tends to result. This is referred to as the "droop" of the system. A certain amount of droop is not undesirable since with an increase in altitude it is possible to drop the manifold pressure slightly and still obtain the same power. This is due to a decrease in the exhaust back pressure. An excessive droop is, however, undesirable. The bellows 139 tends to avoid such an excessive droop. As the atmospheric pressure decreases, the force opposing the upward movement of bellows 136 is decreased, just as though the manifold pressure itself decreased. Consequently, for a given manifold pressure, the position of slider 145 is changed in the direction to increase the manifold pressure. Thus, as the atmospheric pressure decreases, the setting of the system is raised for any given manifold pressure. The size of bellows 139 is so selected that when the lever 51 is set to its extreme right-hand position to maintain military or take-off power, the bellows 139 will provide just enough compensation to obtain the desired amount of droop and constant power. At all settings of the throttle lever 51, the bellows 139 aids in reducing the droop.

When it is desired to land, the manifold pressure selector or slider 278 may be moved downwardly into the range in which a lower manifold pressure is maintained. This permits the throttle to be manually controlled without being affected appreciably by the throttle motor 53. The pilot normally considers it desirable to have complete manual control of the throttle during the landing. If it happens that the plane is going to overshoot or undershoot the field so that it is necessary to take off, the movement of the selector slider 278 to a low manifold pressure position does not present any hazard because of the military power switch 164. As soon as the pilot finds it necessary to take off again and moves the throttle lever 51 to the military power position, switch blade 164 is moved into engagement with contact 166 to give full power independently of the settings of the manifold pressure selector or the manifold pressure vernier as previously explained. Thus, full power is immediately available for take-off.

By retarding the manifold pressure selector under landing conditions, it is assured that the manifold pressure will be sufficiently low that the propeller blades will be maintained at their minimum pitch position due to the slow speed at which the engine is tending to rotate the propellers. This gives the maximum braking effect from the propellers. Furthermore, if it becomes necessary to take off again so that the throttle lever is moved to the maximum power position at which the propeller governor is set to maintain the blades in their minimum pitch position, no change in the setting of the propeller blades is necessary. If the propeller blades were in some intermediate pitch position during the landing and it became necessary to take off, there would be an appreciable delay required for the blades to change to their minimum pitch position such as is desirable for take-off. By maintaining the manifold pressure sufficiently low to keep the blades in their minimum pitch position, this is avoided.

In the above operation, the operation of the adjusting mechanism of the pressure responsive control has been only briefly discussed. The particular arrangement of the means of adjusting springs 132 and 133 has certain unique advantages. As the springs 132 and 133 are rotated to a position in which the springs are more nearly vertical, not only is the tension exerted by springs 132 and 133 on the stem 135 increased but the effective spring rate of these springs, as far as the stem 135 is concerned, is also increased. In other words, with the springs in the position shown, not only do the springs exert less force upon the stem 135 but the amount of force required to move the stem 135 through a predetermined distance is considerably less. Both the force required to move the stem at all and the force required to move it through a predetermined distance increase as the springs are rotated towards a vertical position. As a result, when the springs are in the position shown, a very small change in manifold pressure will make an appreciable change in the position of slider 145. When on the other hand, the springs are in a nearly vertical position, the force required to move the stem 135 through a predetermined distance is much greater. This is important because when the throttle lever is in the advanced range of positions, the amount of movement of the waste gate necessary to effect a change in the compressing effect of the compressor is relatively small because of increased volume of exhaust gases. In order to maintain this power at any appreciable altitude, the throttle is wide open and the waste gate is probably partially closed. Thus, the only adjustment available to take care of an increased need for supercharging is a small movement of the waste gate necessary to completely close the same. When the throttle lever is in the retarded position such as shown, however, the available range of control includes the movement of the throttle from substantially full closed position to open position and the movement of the waste gate from open position to full closed position. Unless a control is very sensitive under these conditions, a very substantial droop will occur. In other words, as the plane ascends with an increasing demand for supercharging, a greater and greater drop in manifold pressure is necessary to effect the necessary adjustment of the waste gate. By reason of my arrangement in which the control is highly sensitive at the low power settings of the throttle, only a slight change in manifold pressure results in a large movement of the control devices sufficient to take care of a wide range of altitude variation.

It will thus be seen that I have provided a system in which the sensitivity is varied in accordance with the necessary range of adjustment to reduce the droop to a minimum. If when the plane is at a relatively high altitude, it becomes necessary to start it, the throttle lever is moved back into the idle position in which it is substantially in the position shown in Figure 1. The movement of the throttle lever to this position causes the spring supports 130 and 131 to be rotated to a position at which they engage the leaf spring member 133 and force the stem 135 downwardly. By reason of the leaf spring 133, the pressure controller stem is forced down much more than would be the case otherwise at high altitudes. Normally at a high altitude, with the engines stopped so that there is no exhaust gas, the low manifold pressure would tend to force the slider 145 to a point calling for closed waste gate even though the lever 127 was in the position shown. By the use of spring 133, however, the stem 135 is forced down to a position in which the waste gate will be open. This is desirable since it is rather difficult to start an engine with a closed waste gate, the closed waste gate in effect acting as a plug for the exhaust pipe. While the same effect as that obtained by spring 133 could be obtained by rotating the springs 130 and 131 downwardly to a point where they pull the stem 135 downwardly instead of upwardly as is normal, this would call for an excessive range of movement of the spring supports 130 and 131. By the use of the leaf spring 133, this is accomplished without an excessive movement of spring supports 130 and 131.

*Calibration of the system*

It is desirable to maintain a predetermined relationship between the propeller speed and the manifold pressure, regardless of the position of the throttle lever 51. Due to individual variations in the engines and various factors associated with the planes, it is possible to only approximately establish these relations without calibrating the controls for the particular engine and particular flight conditions. If merely one calibrator were provided, it would be possible to maintain the desired relationship at one setting of the throttle lever but this desired relationship would not necessarily hold for other settings of the throttle lever. I have, accordingly, provided an arrangement by which the calibration may separately be made for several different positions of the throttle lever 51.

Let us consider first the calibration of the control when the lever 51 is in its most advanced position, that is its military power position. Under these conditions, the switch 164 is effective to disconnect networks 241a, 243, and 244. The cruise calibrating potentiometer 263 is connected in series with the throttle motor, but since the throttle motor under military power conditions is in throttle-open position, the setting of this calibrator has no effect upon the manifold pressure at military power. Thus, by moving the slider 248 of the military calibrating potentiometer 246, the manifold pressure at military power may be set with the assurance that regardless of what may be done to the other controls, this manifold pressure can always be expected when the throttle lever is moved to the military power position.

Considering next the conditions encountered when the lever 51 is between the military power position and the cruising position, that is at the rated power position, the manifold pressure may be adjusted by the manifold pressure vernier potentiometer 272. By a proper adjustment of slider 274, any desired manifold pressure may be obtained. This manifold pressure affects the position of both the throttle and the waste gate and hence affects the manifold pressure obtained under all conditions except military power, under which condition the potentiometer 272 is rendered ineffective.

The conditions for cruising at low altitudes may be adjusted by an adjustment of the cruise calibrator potentiometer 263. By moving the slider 267 with respect to resistor 266, the opening of the throttle relative to the opening of the waste gate may be adjusted. This adjustment affects the manifold pressure only when the conditions are such that the throttle is not completely open. This condition does not normally exist under rated power conditions such as discussed in the previous paragraph. The condition does, however, exist during cruising conditions at relatively low altitudes. Thus, by the adjustment of slider 267, it is possible to adjust the manifold pressure available under normal cruising conditions without affecting the manifold pressure maintained when greater power is needed, such as under rated power conditions.

It will thus be seen that provision is made for independently calibrating the system for three different settings of the lever 51 to insure that at each setting, the manifold pressure will correspond to the desired value for the propeller speed maintained at that position of the lever.

*Operation in the event of failure of networks or power supply*

Provision is made with my apparatus for preventing injury to the aircraft engine if either the apparatus itself or the electrical power supply fails.

Considering first a failure of the apparatus, if the slider 98 fails to make proper contact with resistors 99 or 100 or if any of the other elements fail in the various networks of the compound network of amplifier 178 so as to open the network circuit traced earlier, an auxiliary network circuit is effective to control the input voltage to amplifier 178. This extends from the ungrounded terminal 181 through conductors 184 and 193, resistor 192, secondary winding 188, resistor 195 and ground connections 197 and 183 to the grounded input terminal 82. The effect of this circuit is to cause the input terminal 181 to become positive with respect to the input terminal 182 and hence to cause the throttle motor to be driven towards throttle open position. Since the rebalance shown has no effect upon the operation of this circuit, the motor will move to wide open position and remain there until the network again becomes operative. It is desirable, that if the throttle was to remain in any position that it remain in throttle open position rather than throttle closed position. The presence of resistor 195 does not normally affect the operation of the compound network since it has such a high impedance as to have very little shunting effect. Thus, the resistor is effective only in the event of a network failure to cause the motor to be driven towards open position.

Similar means can be provided in connection with the waste gate motor amplifier 211 to insure that the waste gate motor is run to waste gate open position in the event of a power failure. Since such means is old, it has not been shown in the present application.

Since my apparatus is electrically operated, provision must be made for safe operation in the event of a complete power failure. It will of course be appreciated from the foregoing operation that the throttle is at all times under manual control so that movement of the throttle lever 51 to the idle position causes closure of the throttle. While there is no convenient means for manually controlling the waste gate, provision is made in the apparatus for opening the waste gate in the event of abnormal pressures developing. Whenever the pressure in conduit 28 on the discharge side of the compressor 26 rises to the setting of the relief valve 237, pressure is admitted to the air turbine 238 to cause rotation of rotor 291 in a direction to cause movement of the waste gate towards open position. The final portion of this movement is resisted by the biased stop arm 224. As soon as the pressure condition returns to normal, the biased stop arm 224 is effective to rotate the gear train and rotor back to a position in which the waste gate 20 is partially closed. Not only is this position sufficient to supply air for normal operation but it results in the waste gate being unbalanced sufficiently that the exhaust gas impinging against the same tends to drive the waste gate to an even more closed position. Thus, the waste gate gradually moves back to closed position until such time that the pressure in conduit 28 again builds up to the setting of the relief valve 237. Thus, the waste gate is automatically adjusted in position even in the event of a power failure so as to maintain the pressure as high as possible without exceeding the predetermined maximum safe value. This operation is described more fully in my co-pending application for "Pressure Control Apparatus," filed March 29, 1946.

It will thus be seen that provision is made for safe operation of the engine even though various components of the control system fail or if the power supply itself fails.

Operation of engine checking features

It will be recalled that in the previous description of the operation, mention was made of certain checking features with a statement that these would be referred to in a later portion of the specification. Before taking off, it is normally customary to vary the propeller governor setting to check the operation of the propeller governor. It is also customary to advance the throttle to wide open position without operation of the supercharger to check the condition of the engine and to advance the throttle partly to check the magnetos. In order to carry out these steps, the slider 278 is first moved down with respect to resistance 277 to a low manifold pressure setting. Under these conditions the throttle motor is not energized during the normal range of movement of lever 51 before the military power switch 164 is actuated. The throttle levers 51 are then adjusted to a partially open position, for example, approximately one-third of the way towards throttle open position. If the magnetos are not functioning, the propeller speed will be reduced or the engine will be relatively uneven in its operation. By moving the manifold pressure slider down to its lowermost position and maintaining the throttle levers only partly open, it is assured that the manifold pressure will be sufficiently low that the propellers will be in their low pitch position. Thus, the propeller governors cannot function to correct for improper functioning of the magnetos. Furthermore, it is assured that the turbo supercharger will not be operative to correct any malfunctioning of the engine. The propeller check switch 255a is then operated so as to move switch blade 256 into engagement with contacts 259 and 260. The effect of this is to disconnect from the throttle motor amplifier 178 all of the networks described with the exception of the follow-up network 198 and the portion of secondary 264 between tap 269 and the upper terminal thereof, a connection being established from follow-up network 198, through conductor 500, tap 269, the upper portion of secondary 264, conductor 525, contact 260, switch blade 256, contact 259 and ground connections 530 and 183 to the grounded terminal 182 of amplifier 178. The effect of this is to cause conductor 500, during the half cycle considered throughout the specification, to be highly positive with respect to ground. The amount of this voltage is such that the throttle motor 53 is run to wide open position. The throttle levers 51 can then be retarded to a point where roller 111 is positioned in cam slot 110 adjacent the point a, that is, the point at which the propeller speed is the lowest. The switch 255a is now released so as to return the throttle motor towards a closed position, (the manifold pressure selector slider 278 still being at a low manifold pressure setting) and the throttle returns to the position determined by the setting of the throttle lever 51, a nearly closed position. This requires the propeller governor to change the pitch of the blades, if the speed is to be maintained at the setting of the throttle lever 51. If the propeller does not remain relatively constant, the process should be repeated several times until the propeller governor mechanism has had a chance to become warmed up. It will thus be seen that there is provided means for checking the propeller governor by moving the throttle automatically to open position and then after a change in setting of the propeller governor to move the throttle to nearly closed position.

The propeller governor test can also be made by setting the throttle lever at the point at which the propeller governor is set for its lowest speed, that is, the position in which roller 111 is positioned in cam slot 110 adjacent the point a, and closing the propeller check switch 255a. This forces the propeller pitch to be changed in order to maintain the low speed for which the propeller governor is set.

In order to check the condition of the engine, the throttle is normally advanced manually to a full open position. It is desirable to check the operation of the engine when the propeller pitch is lowest, when the throttle is open, and when the engine is receiving no assistance from the turbo supercharger. By maintaining slider 278 in its lowermost position during the ground test, it is assured that the manifold pressure setting will remain sufficiently low as not to call for movement of the waste gate from open position. Furthermore, the movement of the throttle lever to maximum power position to open the throttle adjusts the propeller governor to maintain the propeller in its low pitch position. However, due to the military power switch 164, advancement of the throttle lever 51 to the maximum power position causes switch 164 to be moved to a position in which the manifold pressure selector network 243 is rendered ineffective. Thus, unless some additional means were provided, the power available under these conditions would be full take-off power. To prevent this, I provide the switch 290. The switch blade 291 thereof is normally in engagement with contact 292 in which position the slider 287 is connected to ground at 295. Upon switch 291 being moved into engagement with contact 293, however, the lower terminal of secondary 282 is connected to ground at 295 so as to lower the potential of the ungrounded terminals of the amplifiers by an amount corresponding to the voltage between the lower terminal of secondary 282 and tap 283. This voltage is so selected that the throttle motor is run to full closed position. Thus, despite the closure of the military power switch, the closure of the engine check switch during the check prevents the operation of the supercharger when the throttle lever 51 is moved to its maximum power position. Thus, a means of preflight checking engine condition without assistance of the turbo supercharger is provided.

SPECIES OF FIGURE 8

In Figure 8, I have shown a slight modification of my present invention. In the arrangement shown in Figures 1 to 7, the roller 126 of lever 127 of the pressure controller is in engagement at all times with both sides of the slot 125 so that there is no lost motion between the cam 73 and the roller 126. Thus, any movement of the lever 51 will cause a change in the manifold pressure.

In the arrangement shown in Figure 8, lost motion is provided between the roller 126 and the slot 125a throughout the main portion of the slot 125a. As a result of this, throughout the intermediate range of adjustment of lever 51, it is possible to move the lever slightly without affecting the pressure. With this modification, the pilot adjusts the individual control levers until the desired manifold pressure is obtained with each engine, as observed by the manifold pressure gauges. The levers are then individually adjusted until the propeller speeds are all synchronized, this latter adjustment being made within the range of lost motion permitted by the slot 125a. By reason of this lost motion, such adjustment does not affect the manifold pressure. With the preferred form of my arrangement, the levers are adjusted until the propeller speeds are the same and then any individual variations in the manifold pressures of the several engines are taken care of by an adjustment of the manifold pressure vernier potentiometer 272. With the arrangement of Figure 8, it is possible to synchronize both the engine speed and the manifold pressure without use of the vernier potentiometer. The arrangement of Figure 8 has the disadvantage, however, that it is somewhat uncertain at any given position of the lever 51 just what the manifold pressure will be. In other words, while the arrangement of Figure 8 makes it possible by manipulation of throttle levers alone to coordinate the engine speeds and manifold pressures, it is open to the objection that there is no fixed manifold pressure for any fixed setting of the lever.

CONCLUSION

It will be seen that I have provided novel control apparatus in which a single manually controlled member is effective to mechanically position the throttle, to adjust the propeller governor, and to control the setting of an automatic controller which in turn positions the throttle. It will furthermore be seen that I have accomplished this without in any way altering the relationship between the manually controlled member and the throttle at either of the extreme positions of the manually controlled member. It will also be apparent that I have provided an arrangement in which a member for manually positioning a throttle also controls the bias applied to a condition responsive controller which controls an impedance network associated with a motor which also positions the throttle. In connection with this, I have also provided an arrangement whereby the sensitivity of the controller is varied at the same time as the control point. It will also be apparent that I have provided in connection with such a controller, where the controller also controls the waste gate of a turbo supercharger, means for insuring that the waste gate is open even at high altitudes in order to facilitate the starting of the airplane.

It will also be seen that I have provided a control arrangement for manually positioning a propeller governor in which a spring associated with the manually positioned member is effective to oppose the internal biasing spring of the propeller governor and thus to provide a relatively uniform action of the manually controlled member. It should also be noted that I have provided means for moving a valve non-linearly and at the same time adjusting a condition responsive means which likewise moves the valve non-linearly.

The safety of my system will also be apparent from a reading of the foregoing description, the throttle being at all times mechanically connected to a throttle lever and the waste gate being subject to the control of an air operated motor.

The foregoing specification also makes it evident that I have provided a novel means and procedure for checking the operation of the propeller governor, the engine, and the magnetos. It will also be apparent that I have provided a novel arrangement for insuring fixed power when the manually controlled lever is in the position thereof calling for maximum power. It is also apparent that I have provided a novel form of linkage for providing a variable amount of lost motion between an actuating member and a member to be positioned.

In the foregoing description, the values of the various elements have been mentioned only in a few instances. In general, it will be appreciated that the invention is not limited to the use of elements having any particular values. Purely for illustration, however, in one particular successful installation, the following values were employed.

| Resistances of Resistors | | Voltages of Secondary Windings | |
| --- | --- | --- | --- |
| | Ohms | | Volts |
| 99 | 700 | 150 | 25 |
| 100 | 300 | 188 | 8 |
| 147 | 525 | 234 | [1] 43.5 |
| 192 | 50,000 | | |
| 195 | 50,000 | | |
| 222 | 925 | | |
| 227 | 625 | 251 | 15 |
| 247 | 500 | 264 | [2] 10.5 |
| 266 | 500 | | |
| 275 | 500 | 273 | 26 |
| 277 | 320 | 276 | 15 |
| 281 | 190 | 282 | [3] 19 |

[1] 24 volts between left-hand end and tap 235, 4.5 volts between taps 235 and 236, and 15 volts between tap 236 and right hand terminal.
[2] 5.5 volts between tap 268 and upper terminal.
[3] 1.5 volts between tap 283 and upper end, 7.5 volts between taps 283 and 284, 10 volts between tap 284 and lower terminal.

In the case of the propeller speeds, the cam 72 is designed in the position shown to set the propeller governor for a propeller speed of 1800 R. P. M. The setting when roller 11 is adjacent point a is approximately 1400 R. P. M. and the setting when the roller 111 is at the opposite end of cam slot 110 is 2500 R. P. M. The pressure responsive control 52 and the control networks of which it forms a part were, in this typical installation, designed to maintain manifold pressures of from eight inches to forty-six inches of mercury, absolute.

As pointed out above, the values given immediately above are purely illustrative of what was employed in one particular system in connection with one particular type of aircraft. The invention is in no way limited to the use of such values. Furthermore, while I have shown a specific form of electrical network and engine control apparatus, it is to be understood that this also is for illustrative purposes only and that the invention is to be limited solely by the scope of the appended claims.

I claim as my invention:

1. In engine control apparatus for an engine having a throttle for controlling the flow of fuel to said engine, a throttle positioning member adapted to be connected to an engine throttle, a manually controlled member, a lost motion mechanical connection between said manually controlled member and said throttle positioning member, a motor also connected to said throttle positioning member for positioning said member within the range of lost motion provided by said connection, and means for remotely controlling said motor.

2. In engine control apparatus for an engine having a throttle for controlling the flow of fuel to said engine, a throttle positioning member adapted to be connected to an engine throttle, a manually controlled member, a lost motion mechanical connection between said manually controlled member and said throttle positioning member, a motor also connected to said throttle positioning member for positioning said member within the range of lost motion provided by said connection, and means adapted to respond to a condition affecting engine operation for controlling said motor.

3. In engine control apparatus for an engine having a throttle for controlling the flow of fuel to said engine, a throttle positioning member adapted to be connected to an engine throttle, a manually controlled member, a lost motion mechanical connection between said manually controlled member and said throttle positioning member, a motor also connected to said throttle positioning member for positioning said member within the range of lost motion provided by said connection, means adapted to respond to a condition affecting engine operation for controlling said motor, and means positioned by said manually controlled member for varying the control point of said last named means.

4. In engine control apparatus for an engine having a throttle for controlling the flow of fuel to said engine, a throttle positioning member adapted to be connected to an engine throttle, a manually controlled member, connecting means between said manually controlled member and said throttle positioning member effective to rigidly connect said members at throttle closed position but providing for a range of independent movement of said throttle positioning member towards open position when said manually controlled member is moved in throttle opening direction, and means for independently moving said throttle positioning member within range.

5. In engine control apparatus for an engine having a throttle for controlling the flow of fuel to said engine, a throttle positioning member adapted to be connected to an engine throttle, a manually controlled member, connecting means between said manually controlled member and said throttle positioning member effective to rigidly connect said members at throttle closed position but providing for a range of independent movement of said throttle positioning member towards open position when said manually controlled member is moved in throttle opening direction, a motor for moving said throttle positioning member within said range, and means adapted to respond to a condition affecting engine operation for controlling said motor.

6. In engine control apparatus for an engine having a throttle for controlling the flow of fuel to said engine, a throttle positioning member adapted to be connected to an engine throttle, a manually controlled member, a lost motion mechanical connection between said manually controlled member and said throttle positioning member, a motor also connected to said throttle positioning member for positioning said member within the range of lost motion provided by said connection, a strain release connection between said motor and said throttle positioning member to enable said manually controlled member to position said throttle positioning member independently of said motor, and means for remotely controlling said motor.

7. In engine control apparatus for an engine having a throttle for controlling the flow of fuel to said engine, a throttle positioning member adapted to be connected to an engine throttle, a manually controlled member movable between first and second positions, mechanical connecting means between said manually controlled member and said throttle positioning member effective to hold said latter member in throttle closed position when said manually controlled member is in said first position and in throttle open position when said manually controlled member is in said second position but to provide for a range of movement of said throttle positioning member independently of said manually controlled member when the latter is in intermediate position, and means for independently moving said throttle positioning member within said range.

8. In engine control apparatus for an engine having a throttle for controlling the flow of fuel to said engine, a throttle positioning member adapted to be connected to an engine throttle, a manually controlled member movable between first and second positions, mechanical connecting means between said manually controlled member and said throttle positioning member effective to hold said latter member in throttle closed position when said manually controlled member is in said first position and in throttle open position when said manually controlled member is in said second position but to provide for a range of movement of said throttle positioning member independently of said manually controlled member when the latter is in intermediate positions, said range of movement increasing as said manually controlled member is moved from said first position to a predetermined intermediate position and decreasing as said manually controlled member is moved from said predetermined intermediate position to said second position, and means for independently moving said throttle positioning member within said range of movement.

9. In engine control apparatus for an engine having a throttle for controlling the flow of fuel to said engine, a throttle positioning member adapted to be connected to an engine throttle, a manually controlled member connected to said throttle positioning member for actuating the same, an electric motor also connected to said throttle positioning member for positioning said member, a balanceable impedance network controlling the operation of said motor, a variable impedance in said network, means adapted to respond to a condition affecting engine operation for varying said variable impedance to control the balance of said network and hence to control the positioning of said throttle by said motor, spring means associated in biasing relation with said condition responsive means, and connecting means between said manually controlled member and said spring means for varying the biasing action of said spring means to vary the control point of said impedance network.

10. In engine control apparatus for an engine having a throttle for controlling the flow of fuel to said engine, a throttle positioning member adapted to be connected to an engine throttle, a manually controlled member connected to said throttle positioning member for actuating the same, an electric motor also connected to said throttle positioning member for positioning said member, a balanceable impedance network controlling the operation of said motor, a variable impedance in said network, means adapted to respond to a condition affecting engine operation for varying said variable impedance to control the balance of said network and hence to control the positioning of said throttle by said motor, spring means associated in biasing relation with said condition responsive means, means for simultaneously varying the effective biasing action and the effective spring rate of said spring means with respect to said condition responsive means, and connecting means between said manually controlled member and said last named means whereby movement of said manually controlled member causes movement of said throttle positioning member and simultaneous adjustment of the control point and sensitivity of said impedance network.

11. In engine control apparatus for an engine having a throttle for controlling the flow of fuel to said engine, a throttle positioning member adapted to be connected to an engine throttle, a manually controlled member, a lost motion mechanical connection between said manually controlled member and said throttle positioning member, a motor also connected to said throttle positioning member for positioning said member within the range of lost motion provided by said connection, means adapted to respond to a condition affecting engine operation for controlling said motor, spring means associated in biasing relation with said condition responsive means, and connecting means between said manually controlled member and said spring means for varying the biasing action of said spring means to vary the control point of said condition responsive means.

12. In engine control apparatus for an engine having a throttle for controlling the flow of fuel to said engine, a throttle positioning member adapted to be connected to an engine throttle, a manually controlled member connected to said throttle positioning member for actuating the same, means including a device adapted to respond to a condition affecting engine operation for also actuating said member, spring means associated in biasing relation with said condition responsive device, means for simultaneously increasing the effective biasing action and the effective spring rate of said spring means with respect to said condition responsive device, and connecting means between said manually controlled member and said last named means such that movement of said manually controlled member in throttle opening direction simultaneously causes open movement of said throttle positioning member and an increase in the control point and a decrease in the sensitivity of said condition responsive device.

13. In combination with an engine having a supercharger for supplying air under pressure to the intake manifold thereof and a throttle for controlling the flow of said air to said intake manifold, a turbine driven by exhaust gas from said engine for driving said supercharger, a by-pass around said turbine, a waste gate in said by-pass for varying the amount of exhaust gas forced through said turbine, means including a device responsive to a pressure condition of the air supplied to said intake manifold for controlling said waste gate and said throttle, biasing means acting upon said condition responsive device for determining the control point thereof, a main control member connected to said biasing means for adjusting the same to vary the control point of said condition responsive device, further means associated with said device and operated by said main control member when moved adjacent one extreme position in pressure decreasing direction to lower abnormally the control point of said pressure responsive device to insure that said waste gate is open regardless of the demand for operation of said supercharger, and a mechanical connection between said main control member and said throtle so that said throttle can be moved to open position regardless of the setting of said condition responsive device.

14. In combination with an aircraft engine connected in driving relation with a variable pitch propeller, means for supplying fuel to said engine, a valve for controlling the amount of fuel supplied to the engine, a speed responsive governor for controlling the pitch of the propeller to maintain a selected speed, adjustable means for adjusting the speed maintained by said governor, means for biasing said adjustable means to a position in which there is maintained a speed intermediate of the range of adjustment, a remote manually positioned member mechanically connected to said valve for varying the amount of fuel supplied to said engine and to said adjustable means for varying the setting thereof, and further biasing means associated with said manually positioned member in such a manner as to oppose the biasing action of said first named biasing means so that when said manually positioned member is connected to said adjustable means said first named biasing means will not affect said member.

15. In engine control apparatus for an engine having a throttle for controlling the flow of fuel to said engine, a throttle positioning member adapted to be connected to an engine throttle, a manually controlled member, a mechanical connection between said manually controlled member and said throttle positioning member effective upon uniform movement of said manually controlled member in one direction to move said throttle positioning member towards throttle open position at an increasing rate, a motor also connected to said throttle positioning member for positioning the same, means adapted to respond to a condition affecting engine operation for controlling said motor in such a manner that upon a uniform change in said condition in one direction, said throttle positioning member is moved towards throttle open position at an increasing rate, and means positioned by said manually controlled member for varying the control point of said last named means.

16. In combination, a valve to be positioned, a manually controlled member, a mechanical connection between said manually controlled member and said valve effective upon uniform movement of said manually controlled member in valve opening direction to open said valve at an increasing rate, a motor also connected to said valve for positioning the same, means responsive to a condition affected by the position of said valve for controlling said motor in such a manner that upon a uniform change in said condition in one direction, said valve is opened at an increasing rate, and means positioned by said manually controlled member for varying the control point of said last named means.

17. In combination, a valve to be positioned, a manually controlled member, a lost motion mechanical connection between said manually controlled member and said valve effective upon uniform movement of said manually controlled member in valve opening direction to open said valve at an increasing rate, a motor also connected to said valve for positioning the same within the range of lost motion provided by said connection, means responsive to a condition affected by the position of said valve for controlling said motor in such a manner that upon a uniform change in said condition in one direction, said valve is opened at an increasing rate, and means positioned by said manually controlled member for varying the control point of said last named means.

18. In combination, an engine having a combustion chamber, a supercharger for supplying air under pressure to said combustion chamber, a device for controlling the compressing effect of said supercharger, a throttle for controlling the flow of air to said combustion chamber, means responsive to an engine operating variable for automatically positioning said throttle and said supercharger controlling device, a manually controlled member for adjusting the control point of said responsive means, mechanical connections between said manually controlled member and said throttle for positioning the latter in the event of a failure of said responsive means, and means responsive to an excessive pressure condition on the discharge side of said supercharger for moving said supercharger controlling device independently of said responsive means to a position in which the compressing effect of said supercharger is decreased.

19. In engine control apparatus for an engine having means for controlling the quantity of fuel supplied to said engine, means responsive to a condition affecting engine operation for positioning said fuel controlling means, a manually positioned main control member for adjusting the control point of said condition responsive means, an auxiliary adjusting means for adjusting the control point of said condition responsive means, and means operative upon said main control member being moved to a position demanding a high output from the engine to render said auxiliary adjusting means ineffective.

20. In combination with an aircraft engine connected in driving relation with a variable pitch propeller, means for supplying fuel to said engine, a throttle for controlling the amount of fuel supplied to the engine, a speed responsive governor for controlling the pitch of the propeller to maintain a selected speed, adjustable means for adjusting the speed maintained by said governor, a manually controlled member connected to said throttle for varying the amount of fuel supplied to said engine and to said adjustable means for varying the setting thereof, a motor for also positioning said throttle, automatic means including a device adapted to respond to a condition affecting engine operation for controlling said motor, and switch means connected to said automatic means for altering the operation of said automatic means for test purposes to cause said throttle to be driven to open position without any change in the position of said manually controlled member so as to determine whether said propeller governor is properly operative.

21. In combination with an aircraft engine connected in driving relation with a variable pitch propeller, means for supplying fuel to said engine, a throttle for controlling the amount of fuel supplied to the engine, a speed responsive governor for controlling the pitch of the propeller to maintain a selected speed, adjustable means for adjusting the speed maintained by said governor, a manually controlled member connected to said throttle for varying the amount of fuel supplied to said engine and to said adjustable means for varying the setting thereof, a motor for also positioning said throttle, automatic means including a device adapted to respond to a condition affecting engine operation for controlling said motor, means positioned by said manually controlled member for varying the control point of said condition responsive device, and switch means connected to said automatic means for altering the operation of said automatic means for test purposes to cause said throttle to be driven to open position without any change in the position of said manually controlled member so as to determine whether said propeller governor is properly operative.

22. In combination with an aircraft engine connected in driving relation with a variable pitch propeller, means for supplying fuel to said engine, a throttle for controlling the amount of fuel supplied to the engine, a speed responsive governor for controlling the pitch of the propeller to maintain a selected speed, adjustable means for adjusting the speed maintained by said governor, a manually controlled member connected to said throttle for varying the amount of fuel supplied to said engine and to said adjustable means for varying the setting thereof, an electric motor for also positioning said throttle, an impedance network including an impedance adapted to respond to a condition affecting engine operation for controlling said motor, and switching means for altering the operation of said impedance network to cause said throttle to be driven to open position without any change in the position of said manually controlled member so as to determine whether said propeller governor is properly operative.

23. In engine control apparatus for an engine having means for controlling the quantity of fuel supplied to said engine, means responsive to a condition affecting engine operation for positioning said fuel controlling means, a manually positioned main control member for mechanically positioning said fuel quantity varying means and for adjusting the control point of said condition responsive means, an auxiliary adjusting means for adjusting the control point of said condition responsive means, means operative upon said main control member being moved to a position demanding a high output from the engine to render said auxiliary adjusting means ineffective, and testing means operative to lower the control point of said condition responsive means by a fixed amount so that said fuel varying means is positioned entirely by said main control member even when said member is moved to said position demanding a high output from said engine.

24. In combination, a member to be positioned, an actuator, a variable lost motion connection between said actuator and said member, said lost motion connection including a link connected to said member and a crank arm secured to said actuator, said link having a slot therein and a cam portion, said crank arm having a first portion displaced from the axis of rotation of said arm and movable within said slot and a second portion cooperable with said cam surface, said cam surface being of such configuration that when said actuator is in one extreme position, said member always assumes a first extreme position and when said actuator is moved away from said extreme position said member is moved away from said first extreme position and can be moved independently of said actuator by reason of the lost motion provided by said portion of said crank arm moving within said slot or said crank arm can cause said link to assume a position displaced from said extreme position after said first portion of said arm has traversed the length of said slot.

25. In combination, a member to be positioned, a first actuator, a second actuator, a variable lost motion connection between said first actuator and said member, said lost motion connection including a link connected to said member and a crank arm secured to said first actuator, said link having a slot therein and a cam portion, said crank arm having a first portion movable within said slot and a second portion cooperable with said cam surface, said cam surface being of such configuration that when said first actuator is in one extreme position, said member always assumes a first extreme position and when said first actuator is moved away from said extreme position said member is moved away from said first extreme position and can be moved independently of said first actuator by reason of the lost motion provided by said portion of said crank arm moving within said slot, and an operative connection between said second actuator and said member.

26. In combination, a member to be positioned, a first actuator, a second actuator, a variable lost motion connection between said first actuator and said member, said lost motion connection including a link connected to said member and a crank arm secured to said first actuator, said link having a slot therein and a cam portion, said crank arm having a first portion movable within said slot and a second portion cooperable with said cam surface, said cam surface being of such configuration that when said first actuator is in one extreme position, said member always assumes a first extreme position and when said first actuator is moved away from said extreme position said member is moved away from said first extreme position and can be moved independently of said first actuator by reason of the lost motion provided by said portion of said crank arm moving within said slot, and an operative connection between said second actuator and said member, said connection including a strain release connection whereby said member can be moved by said first actuator independently of said second actuator.

27. In combination with an aircraft engine connected in driving relation with a propeller, means for supplying fuel under pressure to said engine, means for controlling the pressure of fuel supplied to the engine, means responsive to the pressure of said fuel operation for controlling said last named pressure controlling means, adjusting means for adjusting the control point of said pressure responsive means, a governor for controlling the speed of the propeller, governor adjusting means for adjusting the speed maintained by said governor, a manually controlled member, connections between said manually controlled member, said first named adjusting means, and said propeller adjusting means, said connections being effective upon movement of said manually controlled member in one direction to simultaneously adjust both said pressure responsive means and said governor, the connection between said manually controlled member and said first named adjusting means having lost motion therein so that within the range of said lost motion, the setting of said governor may be adjusted without changing the pressure maintained by said pressure responsive means.

28. In combination with an aircraft engine connected in driving relation with a variable pitch propeller, means including a supercharger for supplying fuel under pressure to said engine, a device for controlling the compressing effect of said supercharger, a throttle for controlling the amount of fuel supplied to the engine, a speed responsive governor for controlling the pitch of the propeller to maintain a selected speed, adjustable means for adjusting the speed maintained by said governor, a manually controlled member connected to said throttle for varying the amount of fuel supplied to said engine and to said adjustable means for varying the setting thereof, a first electric motor for also positioning said throttle, a second electric motor for positioning said supercharger controlling device, impedance network means including an impedance adapted to respond to a condition affecting engine operation for controlling said motors, means also positioned by said manually controlled member for adjusting the control point of said network means to vary the position of both said throttle and said supercharger controlling device, and test switching means for altering the operation of said impedance network means to cause said throttle to be driven to open position without any change in the position of said manually controlled member or said supercharger controlling device so as to determine whether said propeller governor is properly operative.

29. In combination with an aircraft engine having an intake manifold with means for maintaining a desired manifold pressure and a variably adjusted propeller governor for controlling the engine speed, a coordinator unit for variably selecting the control point of the manifold pressure controller of the engine and for adjusting the propeller governor, a single manually adjusted lever for controlling said coordinator unit, and means within said coordinator unit interconnecting the manifold pressure control and the propeller governor with said single lever so that movement of said single lever from a minimum position to a maximum position results in the adjustment of the propeller governor so that there is a decrease in engine speed and an increase in manifold pressure during a first range of movement of said single lever, an increase in engine speed and constant manifold pressure in a second range of movement, and an increase in engine speed and manifold pressure in a third range of movement.

30. In an engine power control apparatus for maintaining a desired power output from a combustion engine by regulating the engine speed and manifold pressure, a coordinator unit adapted to be connected to the engine for maintaining a desired relation between engine speed and manifold pressure, a single manually operated control lever for variably adjusting said coordinator between a maximum and minimum power position, and means within said coordinator for causing the engine speed to be greater when said lever is positioned in the minimum power position than when said lever is in an intermediate position.

31. In engine power control apparatus for an aircraft engine having a variable pitch propeller for varying the engine speed and a fuel supply controlling means, a coordinator unit for determining the relation between fuel supply and propeller pitch, a single lever for determining the power setting of said apparatus by variably adjusting said coordinator unit, said lever causing the propeller pitch and fuel supply to be at maximum values when in the maximum power position, and means including said single lever and said coordinator unit for causing said propeller pitch to be in a direction greater than its minimum position and the fuel supply to be at a minimum value when said lever is in the minimum power position so that sudden movement of said lever to the maximum power position will not necessitate a change in propeller pitch.

32. Control apparatus, comprising in combination, a speed responsive governor for maintaining a preselected speed, adjustable means for adjusting the speed maintained by said governor, means for biasing said adjustable means to a position in which there is maintained a speed intermediate of the range of adjustment, a remote manually positioned member mechanically connected to said adjustable means for varying the adjustment thereof, and further biasing means operatively acting on said member and effective when said last named member is connected to said adjustable means for opposing the biasing action of said first named biasing means so that movement of said manually positioned member is not affected by the biasing action of said first named biasing means.

33. Control apparatus, comprising in combination, a speed responsive governor for maintaining a preselected speed, adjustable means for adjusting the speed maintained by said governor, means for biasing said adjustable means to a position in which there is maintained a speed intermediate of the range of adjustment, a remote manually positioned member, a non-linear coupling means mechanically connecting said adjustable means to said positioned member so that upon continuous movement of said manually positioned member in one direction the controlled speed of said governor is decreased and then increased, and further biasing means operatively connected to said manually positioned member and effective when said last named member is connected to said adjustable means for opposing the biasing action of said first named biasing means so that movement of said manually positioned member is not affected by the biasing action of said first named biasing means.

STEPHEN CRUM.

REFERENCES CITED

The following references are of record in the file of this patent:

UNITED STATES PATENTS

| Number | Name | Date |
|---|---|---|
| 1,095,056 | Winton et al. | Apr. 28, 1914 |
| 2,148,868 | Ludgar | Feb. 28, 1939 |
| 2,154,887 | Baker | Apr. 18, 1939 |
| 2,217,364 | Halford et al. | Oct. 8, 1940 |
| 2,250,984 | Adler | July 29, 1941 |
| 2,380,963 | Greenman | Aug. 7, 1945 |
| 2,388,350 | Taylor | Nov. 6, 1945 |
| 2,389,003 | Schorn | Nov. 13, 1945 |
| 2,396,618 | Stieglitz et al. | Mar. 12, 1946 |
| 2,427,794 | Lee | Sept. 23, 1947 |
| 2,464,548 | Bancroft | Mar. 15, 1949 |

FOREIGN PATENTS

| Number | Country | Date |
|---|---|---|
| 495,444 | Great Britain | Nov. 11, 1938 |